(12) United States Patent
Gordon

(10) Patent No.: US 8,183,812 B2
(45) Date of Patent: May 22, 2012

(54) SYNCHRONOUS OSCILLATING FAN SYSTEM FOR LIVESTOCK SHELTER

(76) Inventor: Larry R. Gordon, Queen Creek, AZ (US)

(*) Notice: Subject to any disclaimer, the term of this patent is extended or adjusted under 35 U.S.C. 154(b) by 350 days.

(21) Appl. No.: 12/584,178

(22) Filed: Aug. 31, 2009

(65) Prior Publication Data

US 2011/0050143 A1 Mar. 3, 2011

(51) Int. Cl.
*G05D 3/12* (2006.01)

(52) U.S. Cl. ............. 318/466; 318/49; 318/50; 318/51; 318/52; 318/53

(58) Field of Classification Search .................. 318/466, 318/49–53
See application file for complete search history.

(56) References Cited

U.S. PATENT DOCUMENTS

| | | | |
|---|---|---|---|
| 6,588,372 B1 * | 7/2003 | Terrell et al. | 119/448 |
| 6,675,739 B2 * | 1/2004 | Terrell et al. | 119/448 |
| 6,883,251 B2 * | 4/2005 | Terrell et al. | 34/527 |

* cited by examiner

*Primary Examiner* — Bentsu Ro
*Assistant Examiner* — David Luo
(74) *Attorney, Agent, or Firm* — Tod R. Nissle, P.C.

(57) ABSTRACT

A synchronous fan system is provided which intermittently calibrates the fans by rotating periodically the fans each to a common stop position.

1 Claim, 10 Drawing Sheets

SYNCHRONOUS OSCILLATING FAN SYSTEM FOR LIVESTOCK SHELTER

This invention pertains to fan systems.

More particularly, the invention pertains to a synchronous fan system to cool livestock within or beneath a shelter.

The utilization of fans to cool livestock is common and is accepted practice. Although current day fan systems seem widely accepted, it always is desirable to provide, if possible, new fan systems.

Therefore, it an object of the present invention to provide a new fan system.

A further object is to provide improvements in a synchronous fan system utilized to cool livestock in a shelter.

These and other, further and more specific objects and advantages of the invention will be apparent to those of skill in the art from the following detailed description thereof, taken in conjunction with the drawings, in which.

Briefly, in accordance with the invention, I provide an improved synchronous fan system. The system comprises a livestock shelter including a roof and floor; live stock in the livestock shelter; at least first and second spaced apart fans each suspended from the roof. Each fan includes a housing; a fan blade rotatably mounted on the housing; a motor mounted on the housing to rotate the fan blade; and, a shaft including a proximate end connected to the housing and including a distal end extending upwardly from the housing. The system also includes a motor connected to the distal end of the shaft of the first fan to oscillate the shaft of the first fan; a motor connected to the distal end of the shaft of the second fan to oscillate the shaft of the second fan; and, a control unit. The control unit synchronously calibrates intermittently the first and second fans by rotating the shafts of each fan to contact simultaneously a common hard stop position, and simultaneously move each fan away from the common hard stop position to oscillate generally synchronously between a selected pair of common steady state points.

Figure 1:
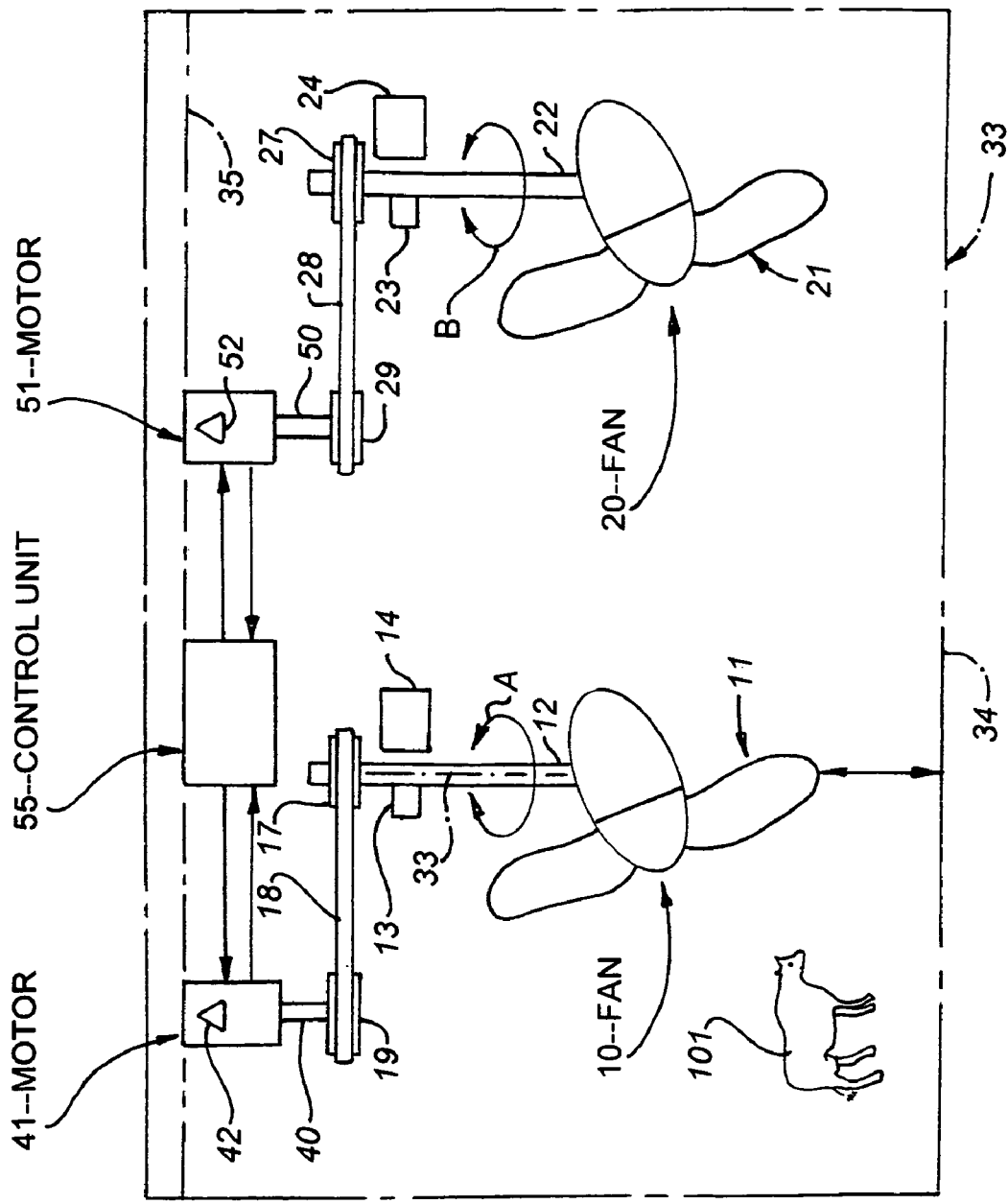
FIG. 1 is a side elevation view illustrating a synchronous oscillating suspended fan system constructed in accordance with the invention.

Turning now to the drawings, which depict the presently preferred embodiments of the invention for the purpose of illustrating the practice thereof, and not by way of limitation of the scope of the invention, and in which like characters refer to corresponding elements throughout the several views, FIG. 1 illustrates a synchronous fan system constructed in accordance with the invention and including a shelter 33, livestock 101 in the shelter, and fans 10 and 20 suspended from the roof 35 of the shelter 33. The shelter 33 comprises a building structure with a roof. The building structure can comprise a barn, can comprise corrugated roof supported above the ground by poles and not including vertically oriented side walls or a door, etc. Shelter 33 includes a floor 34 which can comprise cement, the ground, tile, etc.

It is possible that a fan system constructed in accordance with the invention can be suspended from the roof of a structure by mounting the fan system on cranes, on vertical supports extending upwardly from the ground, on scaffolding extending upwardly from the ground, on supports connected to the side(s) of the structure and extending generally horizontally outwardly to support the fan system or a portion thereof, etc. Such structural support systems for the fan system of the invention typically are rather impractical, but since such systems would function to position fans so that they extend downwardly from and appear suspended from the roof, the are intended to be encompassed by the language suspended from the roof of the structure.

Fan 10 includes a housing. Fan blade 11 is rotatably mounted on the housing, and, a motor is mounted on the housing and is operatively associated with and rotates blade 11 in conventional fashion. The proximate end of shaft 12 is connected to the fan housing. Flange 13 is fixedly attached to and rotates with shaft 12. Stop 14 is connected to roof 35 in a fixed position.

If shaft 12 is being rotating and flange 13 is moving in a direction of travel toward stop 14 and contacts stop 14, stop 14 functions to stop the movement of flange 13 (and shaft 12) in said direction of travel. When shaft 12 rotates in either of the directions indicated by arrows A, the fan housing and fan blade 11 rotate simultaneously with shaft 12. The fan blade 11 is oriented to produce a stream of air that is directed downwardly toward the ground 34 and toward livestock 101 on the ground. A pulley 17 is fixedly mounted on the distal end of shaft 12. Reversible motor 41 rotates shaft 40. A pulley 19 is attached to the distal end of shaft 40. Tensioned belt 18 extends between and around pulleys 17 and 19. When motor 41 rotates shaft 40 and pulley 19 in a first direction, pulley 19 displaces belt 18 in conventional fashion such that pulley 17 and shaft 12 are turned by belt 18 and rotate in the same direction as shaft 40 and pulley 19. Sensor 42 in motor 41 determines the torque produced by motor 41.

If, as will be discussed, shaft 12 is being rotated by pulley 19 and belt 18 to move flange 13 in a direction of travel toward stop 14, and flange 13 contacts stop 14, then stop 14 stops the movement of flange 13 in said direction of travel, pulley 19 continues to rotate, the portion of belt 18 in contact with pulley 19 "slips" (i.e., although pulley 19 turns, belt 18 does not move), and movement of pulley 17 and shaft 12 stops.

When the movement of shaft 12 and pulley 18 stops, sensor 42 detects the increase in torque necessary to turn pulley 19 to overcome the frictional forces produced by the portion of belt 18 contacting pulley 19. Sensor 42 generates a signal to control unit 55 indicating such an increase in torque.

Fan 20 includes a housing. Fan blade 21 is rotatably mounted on the housing, and, a motor is mounted on the housing and is operatively associated with and rotates blade 21 in conventional fashion. The proximate end of shaft 22 is connected to the fan housing. Flange 23 is fixedly attached to and rotates with shaft 22. Stop 24 is connected to roof 35 in a fixed position.

If shaft 22 is being rotated and flange 23 is moving in a direction of travel toward stop 24 and contacts stop 24, stop 24 functions to stop the movement of flange 23 (and shaft 22) in said direction of travel. When shaft 22 rotates in either of the directions indicated by arrows B, the fan housing and fan blade 21 rotate simultaneously with shaft 22. The fan blade 21 is oriented to produce a stream of air that is directed downwardly toward the ground 34 and toward livestock 101 on the ground. A pulley 27 is mounted on the distal end of shaft 22. Reversible motor 51 rotates shaft 50. A pulley 29 is attached to the distal end of shaft 50. Tensioned belt 28 extends between and around pulleys 27 and 29. When motor 51 rotates shaft 50 and pulley 29 in a first direction, pulley 29 displaces belt 28 in conventional fashion such that pulley 27 and shaft 22 are turned by belt 28 and rotate in the same direction as shaft 50 and pulley 29. Sensor 52 in motor 51 determines the torque produced by motor 51.

If, as will be discussed, shaft 22 is being rotated by pulley 29 and belt 28 to move flange 23 in a direction of travel toward stop 24, and flange 23 contacts stop 24, then stop 24 stops the movement of flange 23 in said direction of travel, pulley 29 continues to rotate, the portion of belt 28 in contact with pulley "slips" (i.e., although pulley 29 turns, belt 28 does not move), and movement of pulley 27 and shaft 22 stops.

When the movement of shaft 22 and pulley 28 stops, sensor 52 detects the increase in torque necessary to turn pulley 29 to overcome the frictional forces produced by the portion of belt 28 contacting pulley 29. Sensor 52 generates a signal to control unit 55 indicating such an increase in torque.

FIGS. 3 to 8 illustrate the rotation of a shaft 12 (or 22) about its centerline 33 during operation of the synchronous fan system of the invention. FIGS. 3 to 8 are taken from a perspective above and looking down at a shaft 12 of a fan 10. Shaft 22 and fan 20 move in a manner comparable to that illustrated in FIGS. 3 to 8 for shaft 12 and fan 10.

Figure 3:
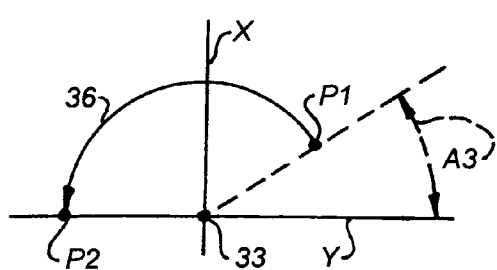
FIG. 3 is a diagram illustrating the mode of operation of the synchronous oscillating suspended fan system of the invention.
Figure 4:
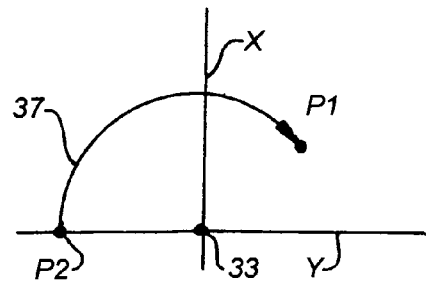
FIG. 4 is a diagram further illustrating the mode of operation of the fan system of the invention.
Figure 5:
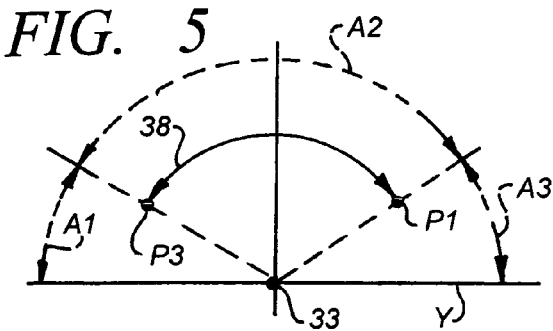
FIG. 5 is a diagram further illustrating the mode of operation of the fan system of the invention.
Figure 6:
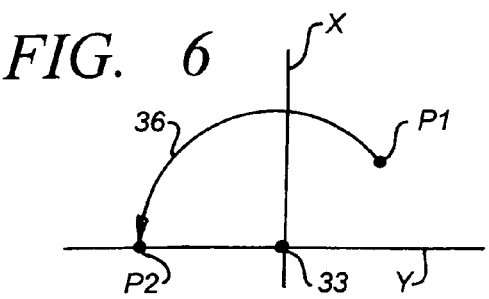
FIG. 6 is a diagram still further illustrating the mode of operation of the fan system of the invention.
Figure 7:
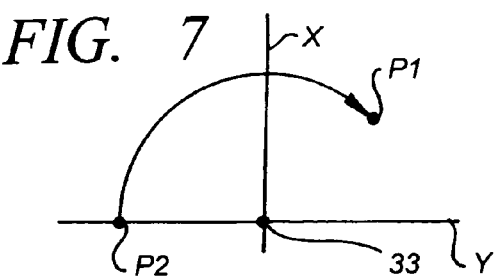
FIG. 7 is a diagram yet still further illustrating the mode of operation of the fan system of the invention.
Figure 8:
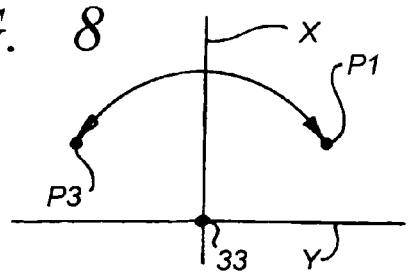
FIG. 8 is a diagram further illustrating the mode of operation of the fan system of the invention.

During operation of the synchronous fan system, each fan 10, 20 in the system participates in a calibration mode, illustrated in FIGS. 3 and 8; participates in a return to steady state mode, illustrated in FIGS. 4 and 7, and participates in a steady state mode, illustrated in FIGS. 5 and 8. In the fan system of FIG. 1, control 55 is programmed to control reversible motor 41 (and motor 51) to rotate in the desired direction for selected periods of time.

When the synchronous fan system is initially turned on, it resumes operation in the particular mode in which the system was turned off, or if the fan system is being turned on for the first time, control 55 can be programmed to begin operation of the fan system in a selected mode. For sake of the examples utilized herein, it is assumed that the fan system begins operation when each shaft 12, 22 (and the fan 10, 20 mounted thereon) is in position P1 in FIG. 3, and control 55 determines that each fan should enter the calibration mode. During the calibration made, motors 41 and 51 rotate shafts 40 and 50, respectively, in the counterclockwise direction indicated in FIG. 3 back to position P2. Such rotation of shafts 40 and 50 turns belts 18 and 19 such that shaft 12 and 22 also rotate in the counterclockwise direction 60 indicated in FIG. 3 back to position P2.

At position P2, flange 13 contacts stop 14 and flange 23 contacts stop 24. When a flange 13, 14 contacts its associated stop 14, 24, the torque sensor 42, 52 in each motor 41, 51 senses an increase in torque produced by motor 41, 51 and sends a signal to control 55. Control 55 is programmed to enter the return to steady state mode illustrated in FIGS. 4 and 7, but will not do so until each shaft 12, 22 has reached position P2. Consequently, if one shaft 12 reaches position P2 before the other shaft 22, control 55 continues to direct motor 41 to turn shaft 40 (and therefore shaft 12) in a counterclockwise direction that ordinarily would move shaft in a counterclockwise direction 60 toward position P2. Since, however, flange 13 is contacting stop 14, shaft 12 and the pulley 17 fixedly mounted on shaft 12 can no longer move in said counterclockwise direction. Belt 18 is mounted on pulleys 17 and 19 such that as shaft 40 and pulley 19 continue to turn when shaft 12 is at position. P2, belt 18 is stationary and pulley 19 slips over belt 18 and/or belt 18 slips over stationary pulley 17. Such continued rotation of shaft 40 and pulley 19 continues to press flange 13 against stop 14, and motor 41 continues to generate increase torque to overcome the slipping of belt 18. Once the other shaft 22 reaches position P2, the sensor 52 in motor 51 sends a signal to control 55 indicating that the torque produced by motor 51 has increased. At this point control 55 is receiving from both motors 41 and 51 signals that the torque has increased, and control 55 directs motors 41 and 51 (and fans 10 and 20) to enter the return to steady state mode of FIGS. 4 and 7 by directing motors 41 to 51 to reverse simultaneously the direction of rotation of shafts 40 and 50 (and therefore of shafts 12 and 22).

During the return to steady state mode of FIGS. 4 and 7, motors 41 and 51 rotate shafts 40 and 50 (and consequently shafts 12 and 22) in a clockwise direction 61, 64 such that shafts 12 and 22 move from position P2 back to position P1. Control 55 is programmed to accomplish this in a selected period of time, say five seconds. After each shaft 12 and 22 has been moved simultaneously synchronously for five seconds in a clockwise direction from position P2, control 55 assumes that each shaft 12 and 22 has reached position P1. After the five seconds has elapsed, control 55 directs motors 41 and 51 (and fans 10 and 20) to enter the steady state mode of FIGS. 5 and 8.

During the steady state mode, motors 41 and 51 to reverse direction and rotate shafts 40 and 50 (and consequently shafts 12 and 22) in a counterclockwise direction such that shafts 12 and 22 move from position P1 to position P3. Control 55 is programmed to accomplish this in a selected period of time, say four seconds. After each shaft 12 and 22 has been moved simultaneously synchronously for four seconds in a counterclockwise direction from position P1, control 55 assumes that each shaft 12 and 22 has reached position P3. As a result, after the four seconds has elapsed, control 55 continues the steady state mode by directing motors 41 and 51 (and therefore fans 10 and 20) to reverse direction and rotate shafts 40 and 50 (and consequently shafts 12 and 22) in a clockwise direction such that shafts 12 and 22 move from position P3 to position P1. Control 55 is programmed to accomplish this in a selected period of time, say four seconds. After each shaft 12 and 22 has been moved simultaneously synchronously for four seconds in a clockwise direction from position P3, control 55 assumes that each shaft 12 and 22 has once again reached position P1. As a result, after the four seconds has elapsed, control 55 continues the steady state mode by directing motors 41 and 51 to again reverse direction and rotate shafts 40 and 50 in a counterclockwise direction such that shafts 12 and 22 move from position P1 to P3. Control 55 continues operating motors 41 and 51 to oscillate 62, 65 (FIGS. 5 and 8) shafts 12 and 22 (and therefore fans 10 and 20) between positions P1 and P3. After a selected period of time in the steady state mode has passed, control 55 operates motors 41 and 51 to again enter the calibration mode, the return to steady state mode, and once again re-initiate the steady state mode. The period of time in the steady state mode can vary as desired, and can, by way of example and not limitation, be ten minutes or two hours. What typically occurs is that as times passes and fans 10 and 20 are in the steady state mode, the fans 10 and 20 gradually lose synchronous movement and are, at the same instant, at different locations between positions P2 and P3. Having fans 10 and 20 enter the calibration mode functions to re-establish or to better approximate synchronous movement of fans 10 and 20. As would be appreciated by those of skill in the art, the synchronous fan system of the invention can be utilized in a fan system in which a control 55 operates two or more fans in a synchronous manner.

Figure 2:
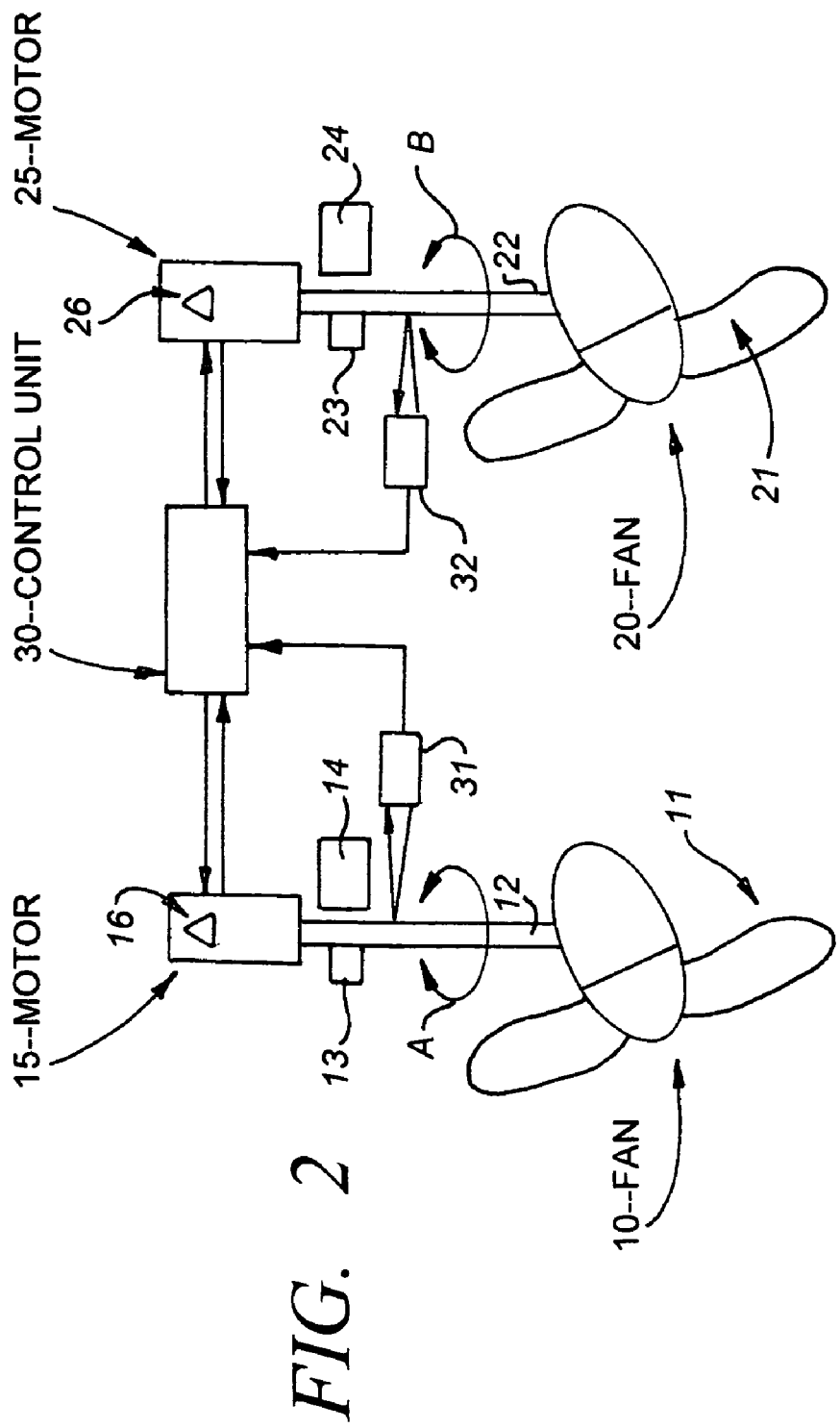
FIG. 2 is a side elevation view illustrating a synchronous oscillating suspended fan system constructed in accordance with another embodiment of the invention.

FIG. 2 illustrates an alternate embodiment of the fan system of the invention that can be mounted in a shelter 33 and suspended to extend downwardly from the roof 35 of the shelter.

The same fans 10, 20 and shafts 12, 22 utilized in FIG. 1 are utilized in the system of in FIG. 2, as are flanges 13 and 23 and stops 14 and 24.

Reversible stepper motor 15 is connected to and rotates shaft 12. Sensor 16 in motor 15 determines the torque produced by motor 15. Reversible stepper motor 25 is connected to and rotates shaft 22. Sensor 26 in motor 25 determines the torque produced by motor 25.

If, as will be discussed, shaft 12 is being rotated by stepper motor 15 to move flange 13 in a direction of travel toward stop 14, and flange 13 contacts stop 14, then stop 14 stops the movement of flange 13 in said direction of travel, and movement of shaft 12 stops.

When the movement of shaft 12 stops, sensor 16 detects an increase in torque, and sensor 16 generates a signal to control unit 30 indicating such an increase in torque. Similarly, when the movement of shaft 22 stops, sensor 26 detects an increase in torque, and sensor 26 generates a signal to control unit 30 indicating such an increase in torque.

Sensors 31 and 34 are operatively associated with shaft 12 and 22, respectively. Each sensor 31, 34 generates 600 primary pulses or electromagnetic waves for each revolution of a shaft 12, 22. Each pulse presently has a "width" of 250 nanoseconds. Control unit 30 includes a multiplier 70 (FIG. 11) which produces ten secondary pulses for each primary pulse received from sensor 31. Control unit 30 also includes counters 100 and 200 (FIGS. 11 and 12) operatively associated with multiplier 70. Control unit 30 further includes an additional multiplier 70A (not shown in the drawings) comparable to multiplier 70 and operatively associated with sensor 32, with stepper motor 25, with additional counters 100A and 200A (not shown in the drawings) equivalent to counters 100 and 200, and with rotating oscillating shaft 22; which additional multiplier 70A, additional counters 100A and 200A, sensor 32, shaft 22, and stepper motor 25 operate in the same fashion as described below with respect to multiplier 70, counters 100 and 200, sensor 31, shaft 12, and stepper motor 15.

The multiplier 70 therefore produces 6000 secondary pulses for each 600 primary pulses received from sensor 31. A counter 100, which will be explained below with respect to FIG. 11, sends a pulse to control unit 30 (i.e., to memory 56 (FIG. 10) and to oscillation motor sub-routine 43) each time the counter receives a selected number of pulses from the multiplier 70. When control unit 30 receives a pulse from counter 100, control unit 30 in most cases sends a pulse to the stepper motor 15 operatively associated with sensor 31. Each pulse received by stepper motor 15 causes the stepper motor to rotate through 1.8 degrees of revolution. Rotating the stepper motor through 180 degrees (one half revolution) causes the shaft 12 to rotate through a full revolution of 360 degrees. Consequently, if motor 15 receives one hundred pulses and continue to rotate in the same direction, motor 15 rotates through 180 degrees and turns shaft 12 one full revolution. As can, however, be seen from the example set forth in FIGS. 3 to 8 and described below, shaft 12 (and 22) typically oscillates through angles less than one-hundred and eighty degrees, and therefore normally will not rotate one full revolution in the same direction, although such is possible.

As noted above, stepper motor 15 will, on receiving 100 pulses, rotate shaft 12 one full revolution. The 6000 pulses produced by multiplier 70 during one full revolution of shaft 12 are divided by one hundred giving sixty pulses from multiplier 70 which must be received by counter 100 in order to generate one pulse to the stepper motor 15. Accordingly, counter 100 is initialized with I=0 in the decade counter 71, and with I=6 in the centennial counter 72, and with switch 80 open. In operation of the counter 100, for each of the next six sets of ten counted, the centennial counter 72 unloads a set of ten counts to the decade counter 71. After the decade counter 71 has counted sixty pulses, I=0 in the centennial counter 72 and switch 80 closes. At the moment switch 80 closes, I=0 in each counter 71 and 72 and counter 71 sends a pulse to the memory and the oscillation motor sub-routine 43 of the control unit 30, after which the control unit 30 sends a pulse to stepper motor 15. Control unit 30 reinitializes counter 100 so that each counter has the I value shown in FIG. 11. Counter 100 then counts another sixty pulses, sends a pulse to control unit 30, control unit sends a pulse to the stepper motor, etc.

Figure 12:
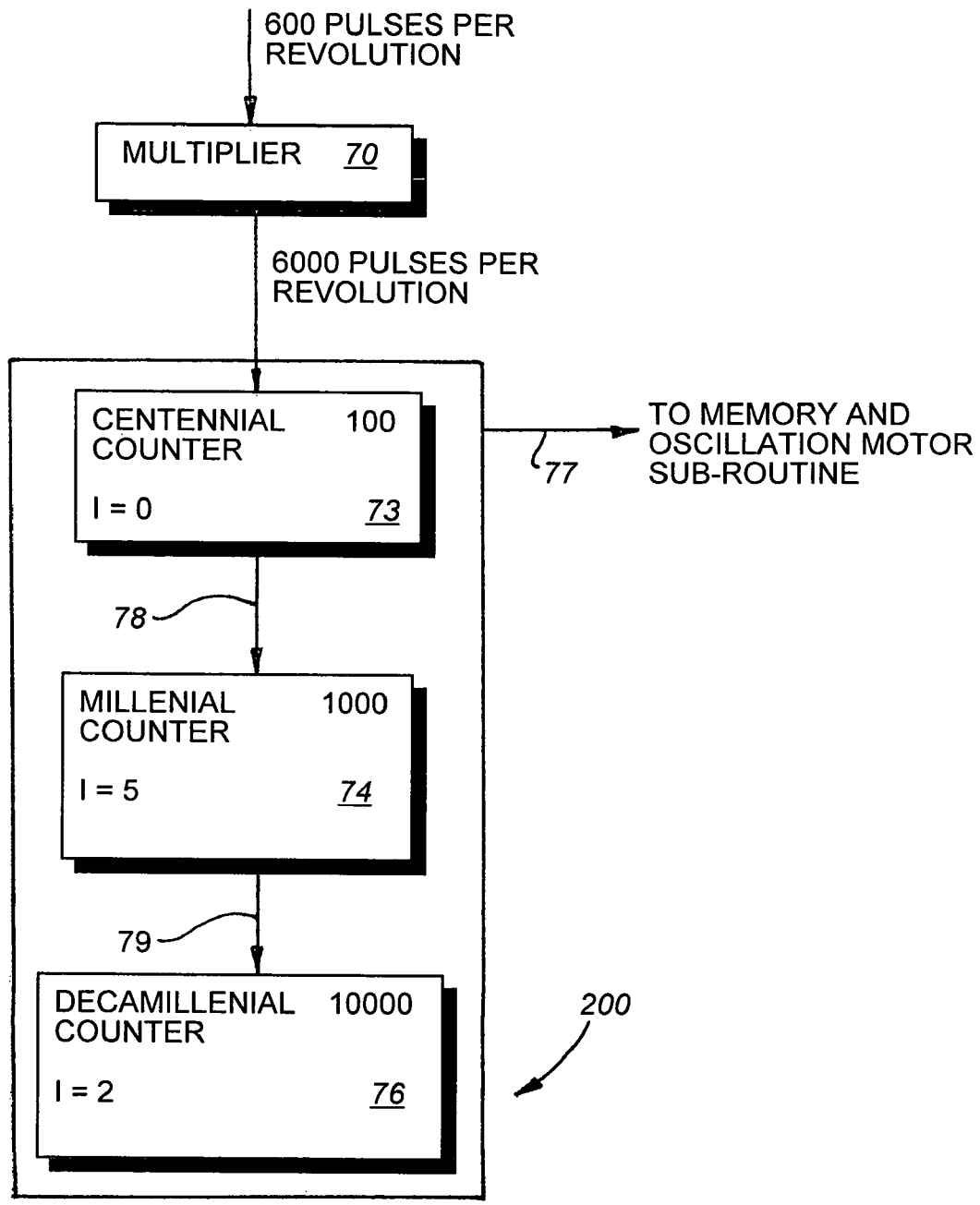
FIG. 12 is a block flow diagram illustrating a further counter system utilized in the apparatus of FIG. 2.

FIG. 12 illustrates a second counter 200. Counter 200 is utilized to determine when shaft 12 has been rotated in a first direction through an arc having a selected angle and, accordingly, when the direction of rotation of the shaft is reversed.

TABLE I

CALCULATION OF MULTIPLIER PULSES REQUIRED TO SWEEP FAN THROUGH SELECTED ANGLE

| ANGLE (FIG. 5) | MEASURE OF ANGLE (in degrees) | MULTIPLIER PULSES | STEPPER MOTOR PULSES |
|---|---|---|---|
| A1 | 30 | 500 | 8 |
| A2 | 120 | 2000 | 33 |
| A3 | 30 | 500 | 8 |
| A1 + A2 | 150 | 2500 | 41 |

Sensor 31, 32 produces 600 pulses per revolution of a fan shaft 21, 22. Multiplier 70 produces 6000 pulses per revolution of a shaft 21, 22**.

Table I indicates the approximate number of multiplier pulses and stepper motor pulses required to rotate shaft 12 and fan 10 mounted thereon through angles A1, A2, A3, and A1+A2 in FIGS. 3 to 8. As noted earlier, angles A1, A2, A3, and A1+A2 are, for sake of example, selected to be 30 degrees, 120 degrees, 30 degrees, and 150 degrees, respectively. These angles can vary as desired.

As is indicated in the diagram comprising FIG. 3, control unit 30 has determined that, after fans 10 and 20 have oscillated at steady state for a selected period of time, fans 10 and 20 must be recalibrated by rotating in a counterclockwise direction 60 from position P1 through angles A1 and A2 (FIG. 5) to the "hard stop" position P2. Rotating shaft 12 of fan 10 (and shaft 22 of fan 20) through an angle of 150 degrees requires approximately 2500 multiplier pulses and 41 stepper motor pulses. Therefore, to enter the calibration mode, control unit 30 initializes counter 200 as shown in FIG. 12 with I=0 in the centennial counter 73, with I=5 in the millenial counter 74, and with I=2 in the decamillenial counter 75. Switches 78 and 79 are open.

In operation of the counter 200, for the next five sets of one counts, the millenial counter downloads a set of one hundred counts to the centennial counter 73. After the centennial counter has counted 500 pulses, I=0 at the millenial counter and switch 78 closes. For the next two sets of one thousand counts, the decamillenial counter 75 downloads a set of one thousand counts to the millenial counter 74. After the millenial counter has counted 2000 pulses, I=0 at the decamillenial counter and switch 79 closes. At the moment switch 79 closes, I=0 in each counter 73 to 75 and counter 73 sends a pulse to oscillation motor sub-routine 43 and to the memory of the control unit 30. At that time control unit 30 checks (1) the signals from the torque sensor 15 in stepper motor 15 to confirm that shaft 12 is in the hard stop position, and (2) the signals from the torque sensor 26 in stepper motor 25 to confirm that shaft 22 is in the hard stop position.

Figure 11:
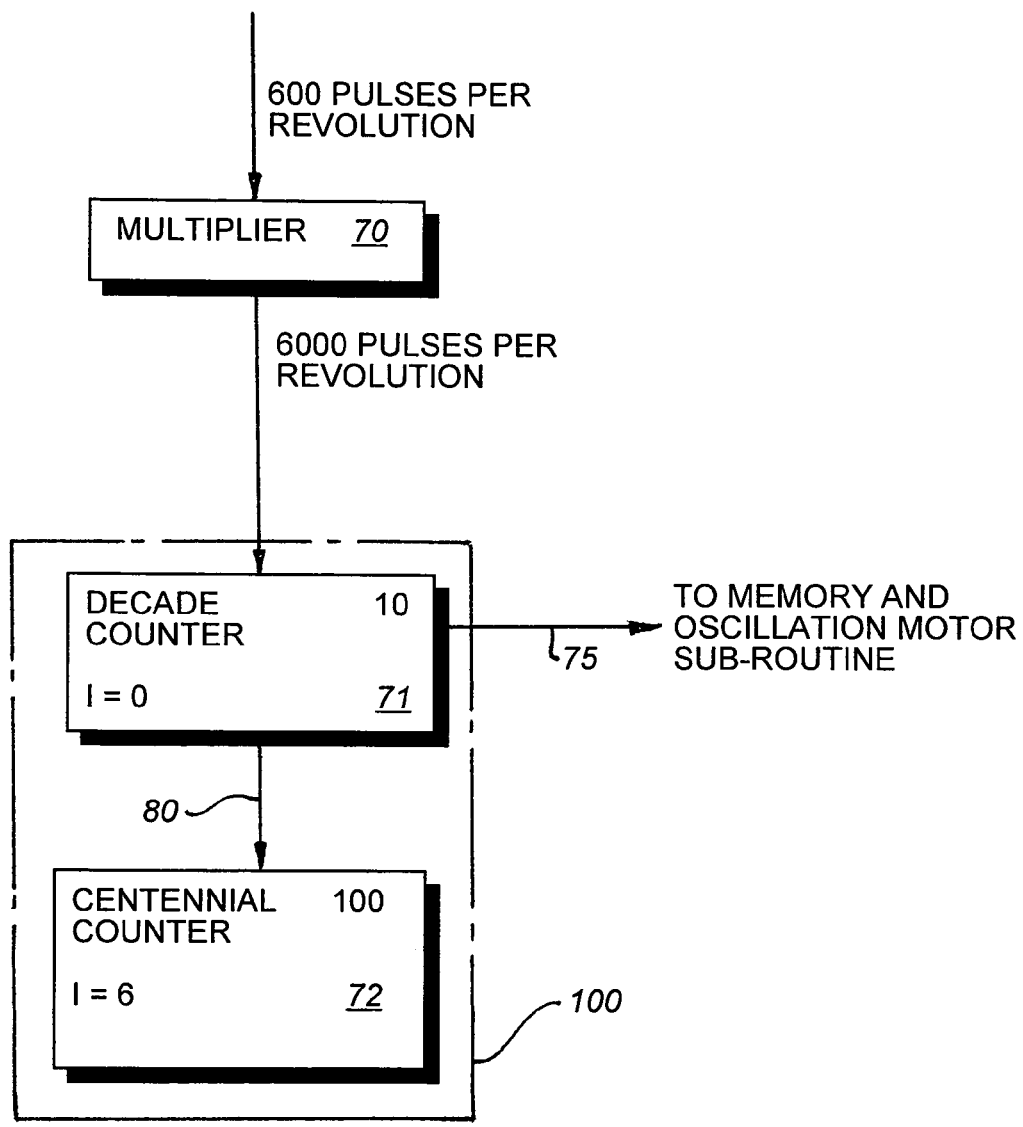
FIG. 11 is a block flow diagram illustrating a counter system utilized in the apparatus of FIG. 2.

1. If shaft 12 is not in the hard stop position, control unit 30 continues transmitting pulses to stepper motor 15 each time control unit receives a pulse from counter 100 (FIG. 11). Once shaft 12 reaches the hard stop position P2, control unit 30 temporarily discontinues transmitting pulses to stepper motor 15 each time control unit 30 receives a pulse from centennial counter 71 (FIG. 11).
2. If shaft 12 is in, or reaches, the hard stop position, control unit 30 determines, based on signals from torque sensor 26, whether shaft 22 is in the hard stop position.
   a. If shaft 22 is in the hard stop position, control unit 30 enters the return to steady state mode by reinitializing counters 200 and 200A so that each counter has the I value shown in FIG. 12. Control unit 30 also (1) orders motors 15 and 25 to reverse their direction of rotation so each shaft 12, 22 will travel in a clockwise direction 61 from the P2 position to the P1 position, and (2) sends a pulse to each motor 15 and 25 when it receives a pulse from counters 100 and 100A, respectively.
   b. If shaft 22 is not in the hard stop position, control unit continues transmitting pulses to stepper motor 25 each time control unit 30 receives a pulse from the counter 100A. Once shaft 22 reaches the hard stop position, control unit 30 enters the return to steady state mode by reinitializing counters 200 and 200A so that each counter has the I value shown in FIG. 12. Control unit 30 also (1) orders motors 15 and 25 to reverse the direction in which each shaft 12, 22 is rotated by motors 15, 25 so that each shaft 12, 22 will travel from the P2 position to the P1 position, and (2) sends a pulse to each motor 15 and 25 when it receives a pulse from counters 100 and 100A, respectively.

In other words, once both shafts 12, 22 have reached the hard stop position P2, control unit 30 enters the return to steady state mode by generating and transmitting signals to motors 15 and 25 that cause motors 15 and 25 to reverse the direction in which each shaft 12, 22 rotates and once again begin rotating shafts 12, 22. If one shaft 12, 22 reaches the hard stop position P2 before the other shaft 12, 22, then control unit 30 does not permit that one shaft to move until the remaining shaft also reaches the hard stop position P2.

Control unit 30 reinitializes counters 200 and 200A with the I values shown in FIG. 12 because, as indicated in FIG. 4, shafts 12 and 22 are rotated through an angle of 150 degrees to position P1 before control unit 30 re-enters the steady state mode by reversing the direction of rotation of shafts 12 and 22. In FIG. 4, after each counter 200 and 200A receives 2500 pulses from multiplier 70 and 70A, respectively, control unit 30 receives a pulse from each counter 200 and 200A. The receipt of these pulses indicates to the oscillation motor subroutine 43 indicates to control unit 30 that shafts 12 and 22 have been rotated to position P1 and that it is time to re-enter the steady state mode and produce the steady state oscillation illustrated in FIG. 5. Consequently, as soon as control unit receives said pulse from each counter 200 and 200A, control unit 30 enters the steady state mode of FIG. 5 and:

1. Reinitializes each counter 200 and 200A with I=0 in the centennial counter 73, with I=0 in the millenial counter 74, and with I=2 in the decamillenial counter 75. Switches 78 and 79 are open.
2. Commands motors 15 and 25 to reverse the direction in which shafts 12 and 22 are rotated such that the shafts rotate in a counterclockwise direction from position P1 to position P3.

As soon as control unit again receives a pulse from a counter 200 or 200A, control unit 30:

1. Reinitializes each counter 200 and 200A with I=0 in the centennial counter 73, with I=0 in the millenial counter 74, and with I=2 in the decamillenial counter 75. Switches 78 and 79 are open.
2. Commands motors 15 and 25 to reverse the direction in which shafts 12 and 22 are rotated such that the shafts rotate in a clockwise direction from position P3 to position P1.

And so on during the steady state mode. Control unit 30 continues to control the rotation of shafts 12 and 22 between the P1 and P3 positions until a selected period of time has passed and control unit 30 recalibrates the fans 10 and 20 by entering the calibration mode and rotating shafts 12 and 22 from the P1 position to the hard stop P2 position in the manner earlier described. The recalibration of the movement of fans 10 and 20 is illustrated (1) in FIG. 6, which indicates the counterclockwise rotation 63 of shafts 12 and 22 from the P1 position to the hard stop P2 position, (2) in FIG. 7, which indicates the simultaneous clockwise movement 64 of shafts 12 and 22 from the hard stop P2 position back to the P1 position, and (3) in FIG. 8, which indicates the resumption of the steady state oscillation 65 of fans 10 and 20 between the P1 and P3 positions.

Figure 9:
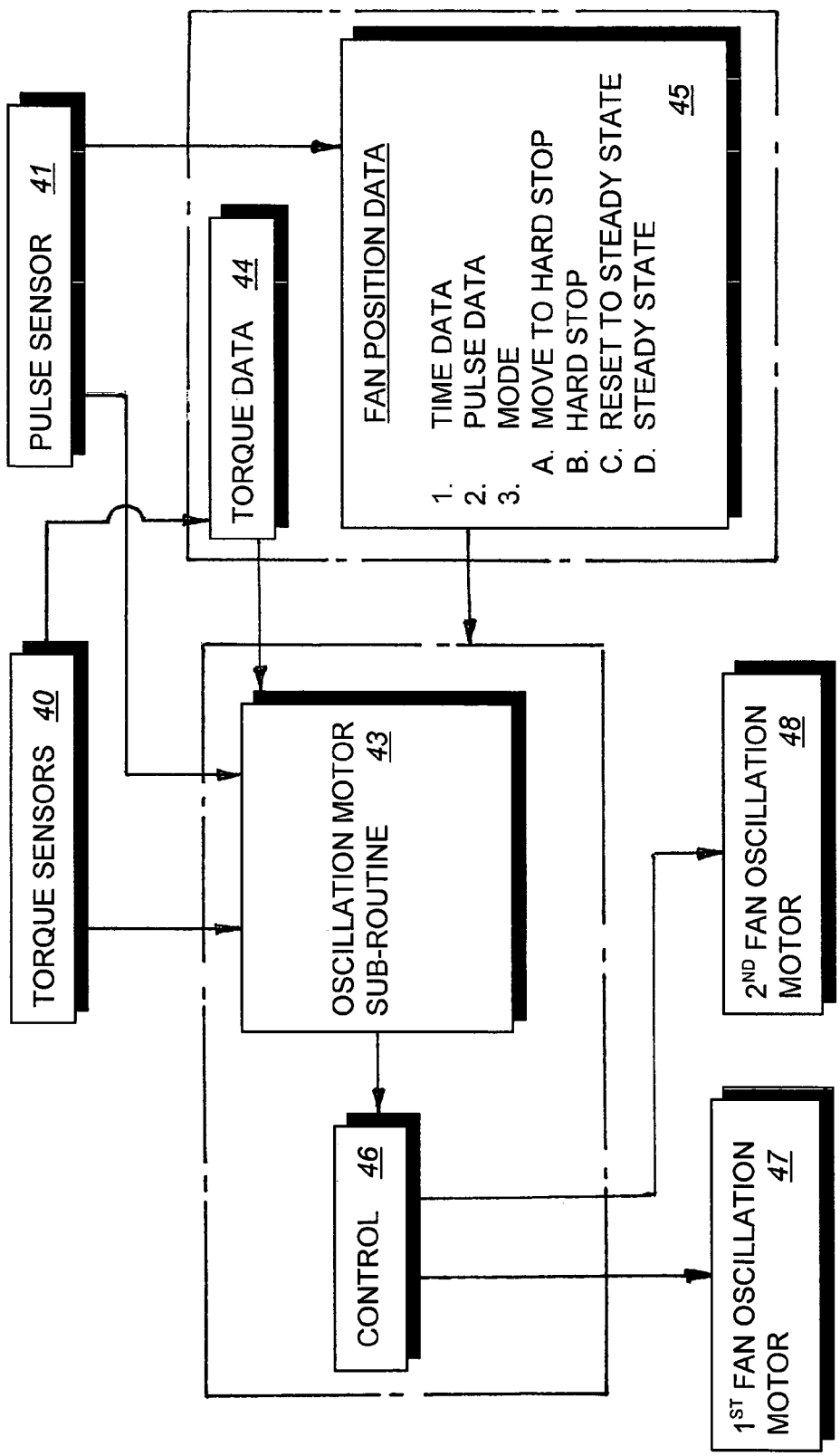
FIG. 9 is a block diagram illustrating an improved synchronous fan operating system embodying the present invention.

FIG. 9 is a block diagram which illustrates a preferred embodiment of a synchronous fan system of the invention, the main components of which are torque sensors 40, pulse sensors 41, a control unit including controller 49A and memory 49B, a first fan oscillation motor 47, and a second fan oscillation motor 48. Examples of torque sensors are sensors 16, 26, 42, 52. Examples of pulse sensors are sensors 31 and 34. Motors 41, 51, 15, 25 comprise examples of fan oscillation motors. Example of a control unit are the afore-mentioned control units 30 and 55.

The controller 49A includes control 46, oscillation motor sub-route 43. Memory 39B includes torque data 44 (from torque sensors 40) and fan position data 45. The fan position data can include time elapsed data (i.e., how long a fan is in steady state or is moving in a particular clockwise or counterclockwise direction), pulse data (from the pulse sensors 41), and mode data. The mode data indicates if a fan 10, 20 is in the calibration mode and is moving toward a hard stop position P2, is at a hard stop position P2, is in the reset mode and is moving clockwise from the hard stop to a position P1 to re-initiate steady state oscillation, or is in the stead state mode and is oscillating back and forth between selected points P1 and P3.

The memory can be any suitable prior art memory unit such as are commonly used in industrial machines, numerical control machines, etc. For example, electromagnetic memories such as magnetic, optical, solid state, etc. or mechanical memories such as paper tape can be used.

Figure 10:
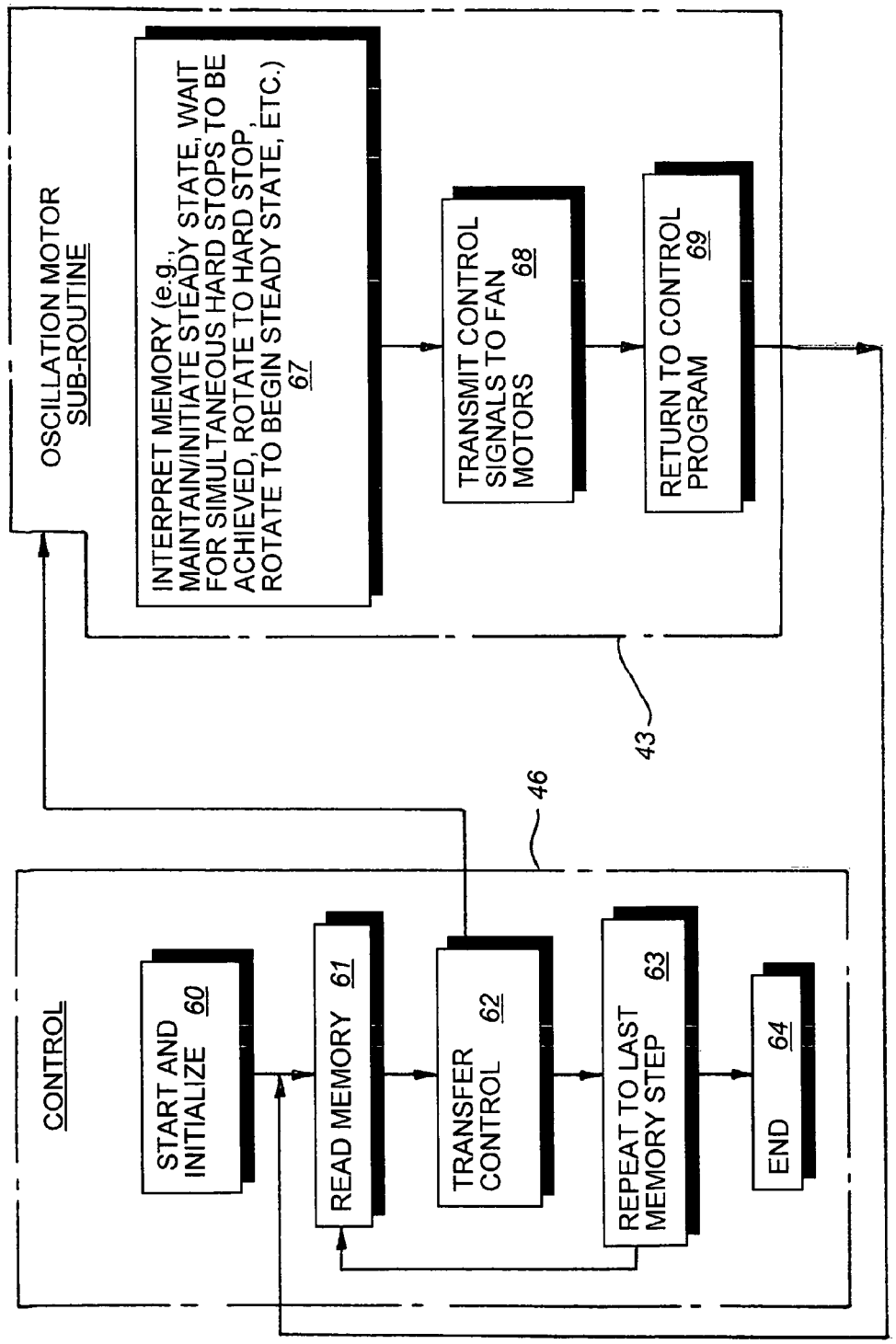
FIG. 10 is a block diagram illustrating a typical program or logic function utilized in accordance with the embodiment of the invention in FIG. 8.

FIG. 10 is a block flow diagram which illustrates a typical program or logic function which is executed by the controller 49A to operate the motors 41 and 51 or 15 and 25. The basic control program 46 consists of commands to "start and initialize" 60, "read memory" 61 and "transfer control" 62 to the oscillation motor sub-routine 43. The oscillation motor sub-routine 43 consists of commands to "interpret memory" 67 (i.e., maintain/initiate steady state, waist for simultaneously hard stop to be achieved, rotate to hard stop, rotate to re-initiate steady state) and "transmit control signals to fan motors" 68, followed by "return to control program" 69. The oscillation motor sub-routine 43 is repeated as indicated by the "repeat to last memory step" 63 of the control program 46, followed by "end" 64, which completes the execution of the program.

In use of the synchronous fan systems of FIGS. 1 and 2, or of comparable systems, the controller 30, 55 operates motors 41, 51, 15, 25 to synchronously oscillate two or more fans in a steady state mode, and, to periodically institute a calibration mode to move fans to a common hard stop position to re-calibrate the fans to better replicate synchronous movement. After the movement of the fans is re-calibrated, the steady state oscillation mode is re-instituted.

During the steady state oscillation mode, the fans in the system oscillate through an arc having a substantially constant size or angle of measurement, or, the arc through which the fans oscillate can vary from steady state mode to steady state mode or can vary during a single steady state mode.

Fans 10 and 20 can be equipped with equipment that injects water droplets or mist into the air streams produced by the fans. Water injection nozzle can be mounted on the oscillating portion of a fan 10, 20, or can be mounted on roof 35 or at some other location that injects water into the air streams exiting the fans 10, 20.

Figure 13:
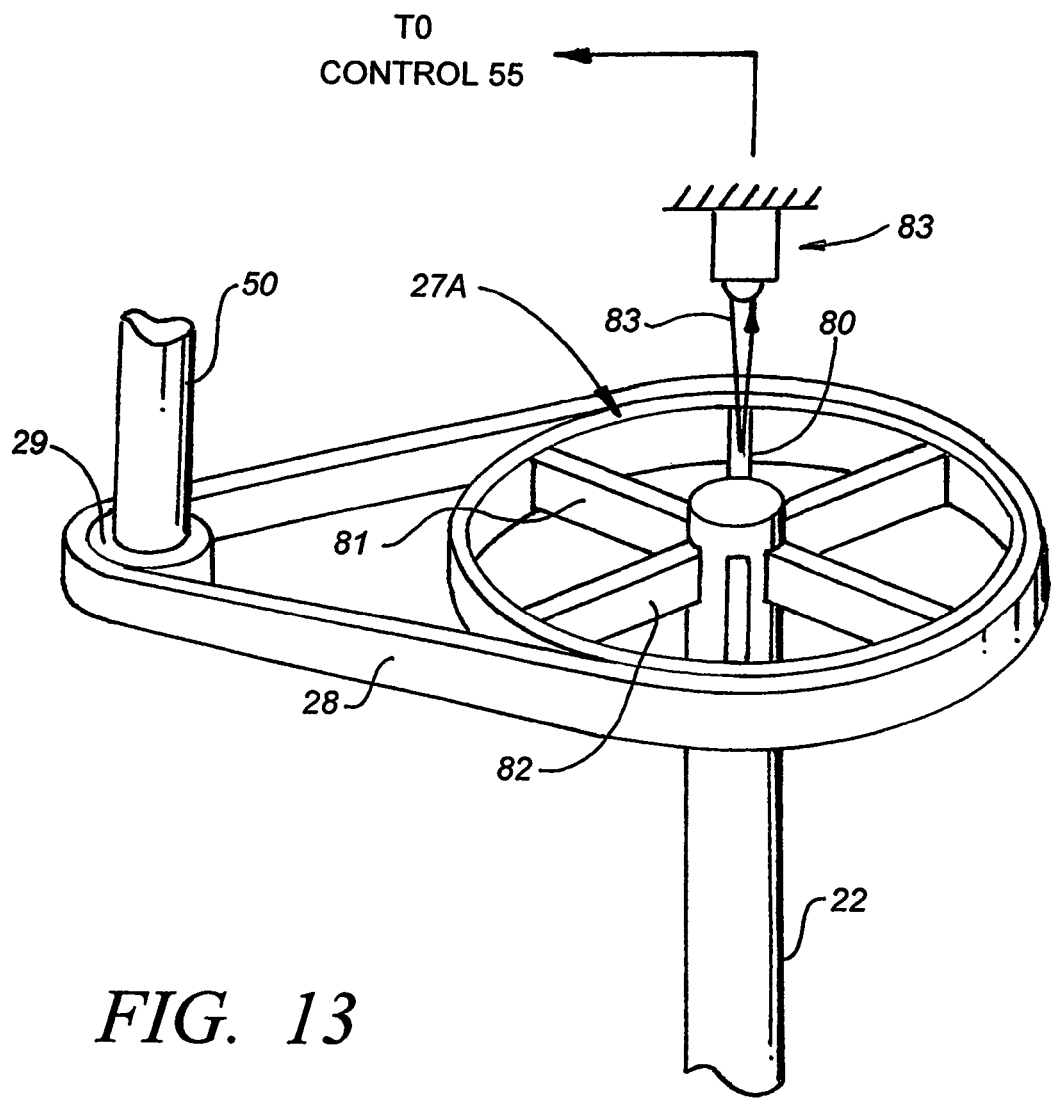
FIG. 13 is a perspective view illustrating an alternate embodiment of the invention.

An alternate embodiment of the invention is illustrated in FIG. 13, and is similar to the embodiment of the invention illustrated in FIG. 1 except that the pulley 17, 27 on each fan shaft 12, 22 is replaced with a pulley 27A having a larger diameter than the pulley 19, 29 on the shaft 40, 50 of each motor 41, 51. The larger pulley 27A enables a belt 18, 28 to generate more torque on shaft 12, 22 and reduces the likelihood that a stepper motor will "lose" or miss pulses while working to overcome the weight of a fan 10, 20. The larger pulley 27A also permits a smaller stepper motor to be utilized when the stepper motor pulley 29 (FIG. 13) is smaller than pulley 27A. A sensor 83 is also utilized in conjunction with pulley 27A. The sensor 83 generates a signal to control 55 each time sensor 83 detects 84 a spoke 80, 81, 82 of pulley 27A passing beneath sensor 83. Control correlates, during the oscillation of a fan in each direction, the number of spokes passing beneath sensor 83 with the number of pulses generated by a stepper motor 41, 51 during such oscillation. In the event the stepper motor has "lost" some pulses, the data generated by sensor 83 provides a way for control 55 to determine approximately how far a fan 10, 20 has oscillated. If, based on the data generated by sensor 83, it appears that a fan 10, 20 is significantly out of synch with other fans, control 55 can direct the fans 10, 20 to enter the calibration mode. The size of the first pulley 29 with respect to the second pulley 27A can vary as desired, but the diameter of the second pulley 27A with respect to the first pulley 29 is in the range of 5:1 to 25:1, preferably 10:1 to 20:1, and most preferably 12:1 to 18:1. Pulley 29 presently has a diameter of one inch, and pulley 27A a diameter of fourteen inches.

The motors 41, 51 used to turn belts 18 and 28—and therefore fans 10 and 20—in FIG. 1 can comprise DC motors, stepper motors, or any other desired motor. Similarly, the "direct drive" motors in FIG. 2 can each comprise a DC motor, stepper motors, or any other desired motor. Stepper motors are presently preferred because a stepper motor slips inherently at a given torque and voltage when overloaded. Under normal operating conditions a stepper motor will not slip, but if the motor is overloaded it will slip without damaging the motor and associated hardware. If pressure that is applied to a fan 10 and to prevent the fan from rotating is too great, magnetic slippage is created in the stepper motor. This reduces the risk that the fan system of the invention will be damaged in the event a piece of equipment or an animal interferes with and impedes movement of a fan 10, 20. Further, in the event movement of a fan 10, 20 is impeded by a piece of equipment, an animal, or some other force or object, control 30, 55—with the assistance of data input from a sensor 42, 52, 16, 26, 31, 32, 83—detects that the fan 10, 20 is out-of-synch and can cause all of the fans to rotate to a hard stop in the manner earlier described to "initialize" the fans so they one again synchronously oscillate.

When a stepper motor is utilized, it is not necessary that a belt 18, 28 slip in the event movement of a fan 10, 20 is impeded.

Another advantage of a stepper motor is that the programming in the microprocessor in each stepper motor permits each motor to be programmed to alter the arc of oscillation of the fan associated with the stepper motor. Each fan can be programmed to oscillate through the same arc, or, can be programmed to oscillate through an arc different from that of another fan(s).

A DC motor is not presently preferred because it appears difficult to determine the life of brushes in the motor, and because it likely would require a clutching mechanism be utilized in combination with the DC motor.

Synchronous fan systems earlier described herein utilize a mechanical hard stop comprising, for example, a flange 13 or 23 which contacts a fixed stop 14 or 24, respectively (FIG. 1). An alternate embodiment of the invention relies principally on an electronic, instead of a mechanical, hard stop. In this alternate embodiment of the invention, a mechanical hard stop can still, if desired, be utilized as a backup in the event the electronic hard stop malfunctions or fails. Although, as would be appreciated by those of skill in the art, an electronic hard stop in accordance with the invention can, based on the principles in the preceding and following disclosure, be constructed in various ways, a presently preferred construction is illustrated in FIG. 14.

Figure 14:
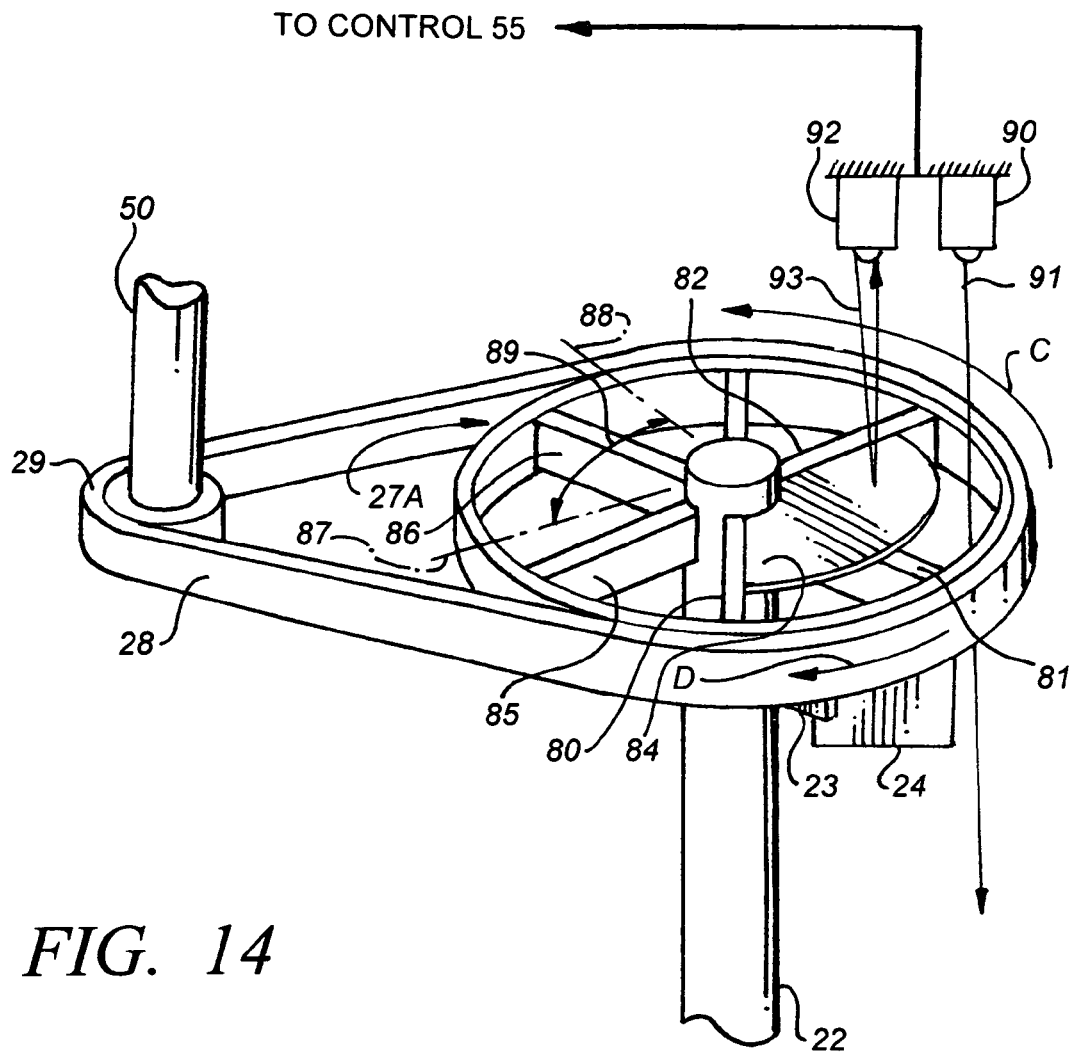
FIG. 14 is a perspective view illustrating an alternate embodiment of the invention; and, FIG. 15 is a perspective view illustrating an alternate embodiment of the invention.

In FIG. 14, a pie-shaped piece 84 of metal or other material is mounted on pulley 27A. Pulley 27A includes spokes or ribs 80, 81, 82, 85, and 86. Each spoke 80, 81, etc. includes a longitudinal centerline extending radially from the center of circular pulley 27A. Sensors 90 and 92 are coplanar with fixed stop 24, i.e., sensors 90, 92 and stop 24 lie in a common vertical plane. Flange 23 is fixedly attached to rotating, oscillating shaft 22, is located beneath spoke 81, and lies in a common vertical plane with spoke 81. The spokes 80-82, 84, 85 are evenly spaced such that the angle between the longitudinal center lines of any sequential pair 85-86, 80-85, 81-80, 82-81 of spokes is sixty degrees. Pie-shaped piece 84 extends through an arc of one hundred and twenty degrees. Spoke 81 effectively bisects piece 84, i.e., about one-half of piece 84 extends to one side of spoke 81, while the other half of piece 84 extends to the other side of spoke 81. Pulley 27A is, along with sensors 90 and 92 described below, utilized in place of pulley 27 in FIG. 1. A pulley equivalent to pulley 27A is also, along with another pair of sensors 90 and 92, utilized in place of pulley 17 in FIG. 1.

Optical sensors 90 and 92 continuously emit laser or other light rays 91 and 93, respectively. As would be appreciated by those of skill in the art, any desired sensor or sensor system can be utilized in place of or in conjunction with each optical sensor 90 and 92. Each sensor 90, 92 is mounted in a fixed position above pulley 27A. When a spoke 80-82, 85, 86 is directly beneath sensors 90 and 92, light emitted by each sensor is reflected upwardly back to the sensor in the manner indicated by light ray 93 in FIG. 14. This, along with the number of steps required by the stepper motor turning shaft 50 to rotate pulley 27A through a sixty degree arc, enables control 55 to determine the location of pulley 27A, and therefore of the fan 20 that is being rotated back-and-forth along with pulley 27A and with shaft 22 fixedly attached to pulley 27A.

When pulley 27A is being rotated in a direction, for example the direction indicated by arrow C in FIG. 14, each light 91, 93 from each sensor 90 and 92 is simultaneously reflected off the top of a spoke 80-82, 85, 86 when the spoke passes directly beneath the sensors 90 and 92. Sensors 90 and 92 detect light that is reflected off a spoke and back to sensors 90 and 92 and, consequently, generate signals that are transmitted back to control 55.

As soon as a spoke 80-82, 85, 86 moves from beneath sensors 90 and 92, light emitted by a sensor 90 and 92 is no longer reflected back to sensor 90, 92 but passes through an open space in pulley 27A in the manner illustrated for light 91 in FIG. 14. When light is not being reflected back to a sensors 90 and 92, the sensors no longer simultaneously generate signals back to control 55 and control 55 "knows" that a spoke is no longer positioned beneath sensors 90 and 92.

When, however, pulley 27A is moving in the direction of arrow C and spoke 82 completes its pass beneath sensors 92 and 90, sensor 90 no longer receives reflected light because light 91 from sensor 90 passes through pulley 27A in the manner illustrated in FIG. 14. Sensor 92, on the other hand, continues to receive light reflected off piece 84 and, continues to generate signals to control 55.

In the event control 55 receives signals from sensor 92 but does not receive signals from sensor 90, control 55 realizes that piece 84 is passing beneath sensor 92 and that flange 23 is approaching stop 24. Control 55 is programmed with an electronic hard stop that halts the stepper motor turning shaft 50—and therefore halts movement of shaft 22 and fan 20 on shaft 22—before flange 23 contacts 24. For example, the electronic hard stop may comprise halting the stepper motor and the rotation of pulley 27A and flange 23 when flange 23 is at a point which is about ten degrees of rotation from stop 24, and from being positioned beneath sensors 90 and 92. If fan 20 is being synchronized and recalibrated with fan 10 (FIG. 1) and if fan 20 reaches the desired electronic hard stop prior to fan 10, then control 55 orders the stepper motor turning shaft 50 to stop and allows the stepper motor turning shaft 40 (and therefore shaft 12 and fan 10) to continue turning shaft 40 until flange 13 is at a point (i.e., the electronic hard stop) which is about ten degrees of rotation from stop 14.

Once each shaft 12, 22 and its associated pulley 27A reaches the desired electronic hard stop, control 55 reactivates simultaneously the stepper motors associated with shaft 40 and 50 so that fans 10 and 20 simultaneously and synchronously are moved in the direction indicated by arrow D in FIG. 14 (which direction is opposite that of the direction indicated by arrow C) and such that flanges 13 and 23 move away from stops 14 and 24. The stepper motors continue to turn shafts 40 and 50 in the direction of arrow D until a first oscillation end line, indicated in FIG. 14 by dashed line 87, is reached, and said end line is positioned directly beneath sensors 90 and 92. After the first oscillation end line indicated by line 87 is reached, control 55 reverses the direction of rotation of the stepper motors, and accordingly fans 10 and 20, until a second oscillation end line, indicated in FIG. 14 by dashed line 88, is reached and said second oscillation end line is positioned directly beneath sensors 90 and 92. Lines 87 and 88 are imaginary lines, and are not positioned on a spoke 80-82, 85, 86. As a result, light from sensors 90 and 92 is not reflected by such lines. If one or more of the oscillation end lines were coincident with a spoke 80-82, 85, 86, then light from sensors 90 and 92 would be reflected back to the sensors when the spoke was positioned directly beneath the sensors 90 and 92.

When the second oscillation end line 88 is reached, control 55 again reverses the direction of rotation of the stepper motors to move pulleys 27A and fans 10 and 20 to again position the first oscillation end line 87 under both sensors, and so on. Oscillation of shafts 12 and 22 and fans 10 and 20 back and forth between said first and second oscillation end lines continues until the oscillation end lines are reset, until the fans must be recalibrated because the required number of steps to reach a spoke is outside of a selected range, or, until control 55 determines that fan 10 is out-of-synch with fan 20. If control 55 determines that fan 10 is out-of-synch with fan 20, control 55 generates signals to the stepper motors 41, 51 that are operatively associated with fans and 20 to move each fan 10, 20 back to an equivalent electronic hard stop in the manner discussed above. After each fan 10, 20 reaches its electronic hard stop, each fan is pointing in the same direction. Control 55 then activates simultaneously the stepper motors to move the fans 10 and 20 to position the first selected oscillation end line under sensors 90 and 92, then to position the second selected oscillation end line under sensors 90 and 92, then to position the first selected oscillation end line under sensors 90 and 92, and so on.

As would be appreciated by those of skill in the art, control 55 can be programmed to set the first and second oscillation end lines at any desired position as long as oscillation of a fan 10, 20 between such end lines does not require a flange 13, 23 to pass through a fixed stop 14, 24.

Control 55 can determine the location of each spoke 80-82, 85, 86 and of the oscillation end lines 87, 88 because control 55 knows the number of steps that must be produced by the stepper motor to rotate pulley 27A through an arc of travel equivalent to the arc from one spoke 85 to the next 86, to move from the electronic hard stop through an arc of travel to a first selected oscillation end line 87, and to move from a spoke 86 through an arc of travel to a selected oscillation end line 87 or 88. Sensors 90 and 92 continually provide control 55 with an indication of when spokes 80-82, 84, 85 (or some other selected reference point(s)) pass beneath sensors 90 and 92. In order to determine the location of a pulley 20 and its associated fan, control 55 correlates signals from sensors 90 and 92 with data indicating the number of steps produced by a stepper motor in rotating pulley 27A to move one spoke 80-82, 85, 86 out from beneath sensors 90 and 92 and moving another sequential spoke to a position beneath sensors 90 and 92. The following example is presented by way of illustration, and not limitation, of the invention.

EXAMPLE I

Embodiment of the Invention in FIG. 14

A stepper motor 51 must turn, or produce, one-hundred and twenty steps to rotate a pulley 27A (and its associated fan 20)

through an arc of sixty degrees. Rotating pulley 27A through an arc of sixty degrees is sufficient to move a first spoke 86 out from beneath sensors 90 and 92 and to replace the first spoke with a second sequential spoke 85 when pulley 27A is turned in the direction of arrow D in FIG. 14. Accordingly, each two steps produced by motor 51 rotate pulley 27A through a one degree arc.

A. Distances in Degrees of Electronic Hard Stop from Spokes and Oscillation End Lines If the electronic hard stop that is selected stops and places flange 23 at a position that is ten degrees of arc away from stop 24, if the second oscillation end line 88 is, in FIG. 14, twenty degrees of arc away from spoke 86 (i.e., away from the radial longitudinal centerline of spoke 86), and if the first oscillation end line 87 is, in. FIG. 14, five degrees of arc away from spoke 87 (i.e., away from the radial longitudinal centerline of spoke 85), then 450 steps must be produced by stepper motor 51 to rotate pulley 27A in the direction of arrow D from the selected electronic hard stop (at which flange 23 is ten degrees of arc away from stop 24) to a position at which the first oscillation end line 87 is positioned directly beneath sensors 90 and 92. When flange 23 and shaft 22 are stationary in the hard stop position with flange 23 ten degrees of arc from fixed hard stop 24, sensors 90 and 92 are in a position that is fifty degrees of arc away from the radial centerline of spoke 82, 150 degrees of arc away from end line 88, 170 degrees of arc away from the radial centerline of spoke 86, and 225 degrees of arc away from the end line 87.

B. Movement of Pulley 27A from Hard Stop to Radial Centerline of Spoke 86

In order to move pulley 27A in the direction of arrow D from the hard stop to the radial centerline of spoke 86, control 55 commands stepper motor 51 to move shaft 50 three hundred and forty steps to rotate pulley 27A in the direction of arrow D to place the radial centerline of spoke 86 directly beneath sensors 90 and 92.

C. Movement of Pulley 27A from the Radial Centerline of Spoke 86 to Oscillation End Line 87

The microprocessor and computer program utilized by the microprocessor in control 55 knows that the distance from the centerline of spoke 86 to end line 87 consists of a fifty-five degree arc and that it should required one hundred and ten steps to turn pulley 27A through the fifty-five degree arc. After the stepper motor generates one hundred and ten steps and moves pulley 27A in the direction of arrow C through a distance generally equivalent to a fifty-five degree arc (so that end line 87 is presumably positioned directly beneath—but not detected by—sensors 90 and 92), control 55 assumes that end line 87 is positioned directly beneath sensors 90 and 92.

The Reset Function

In order to move pulley 27A in the direction of arrow C from the first oscillation end line 87 to the second oscillation end line 88, one hundred and fifty steps must be produced by stepper motor 51 to rotate pulley 27A a sufficient distance in the direction of arrow C. Further, the microprocessor and computer program utilized by the microprocessor in control 55 know that the distance from oscillation end line 87 to the center line of spoke 86 should comprise one hundred and ten steps. When pulley 27A is being turned in the direction of arrow C to move pulley 27A from a position with oscillation end line 87 under sensors 90 and 92 to a position with the center line of spoke 86 directly under sensors 90 and 92, control 55 resets the counter to zero when the center line of spoke 86 is reached. If the number of steps required to move pulley 27A from a position with end line 87 directly under sensors 90 and 92 to a position with the center line of spoke 86 directly under sensors 90 and 92 is less than or more than one hundred and ten steps, control 55 still resets the counter to zero unless the number of steps is greater than or less than one hundred and ten steps within a selected range. If, for example, the range is plus or minus four steps, then control 55 resets the counter to zero if the number of steps required to move from end line 87 to the centerline of spoke 86 is in the range of one hundred and six to one hundred and fourteen steps. If the number of steps required is outside this range (for example one hundred and two steps), then control 55 initiates recalibration by moving each fan to the electronic stop in the manner noted above in order to recalibrate synchronously the fans. If the number of steps required to move pulley 27A from a position with end line 87 directly under sensors 90 and 92 to a position with the center line of spoke 86 directly under sensors 90 and 92 is within the selected range and control 55 resets the counter, then control 55 permits the stepper motor to continue to move pulley 27A in the direction of arrow C until end line 87 is positioned beneath sensors 90 and 92.

D. Movement of Pulley 27A from Oscillation End Line 87 to the Radial Centerline of Spoke 86.

After end line 87 is presumably positioned beneath sensors 90 and 92, control 55 reverses the stepper motor such that stepper motor again generates one hundred and ten steps and moves pulley 27A in the direction of arrow D through a distance generally equivalent to a fifty-five degree arc and such that the centerline of spoke 86 should once again be positioned under sensors 90 and 92.

If the number of steps required to move pulley 27A from a position with end line 87 positioned under sensors 90 and 92 to a position with the centerline of spoke 86 positioned under sensors 90 and 92 is one hundred and ten steps, or, is greater than or less than one hundred and ten steps within the selected range of one hundred and six steps to one hundred and fourteen steps), control 55 resets the counter to zero, and permits the stepper motor to continue moving pulley 27A in the direction of arrow D. If, on the other hand, the number of steps required to move pulley 27A from a position with end line 87 positioned under sensors 90 and 92 to a position with the centerline of spoke 86 positioned under sensors 90 and 92 is outside the selected range, control 55 initiates the recalibration procedure and directs each fan 10, 20 to its electronic hard stop. After fans 10 and 20 are simultaneously at the electronic hard stop, control 55 directs the stepper motors in control of fans 10 to 20 to resume simultaneously synchronous oscillation.

E. Movement of Pulley 27A from Spoke 86 to Oscillation End Line 88

After the radial centerline of spoke 86 is aligned directly beneath sensors 90 and 92 and control permits continued movement of pulley 27A in the direction of arrow D, the stepper motor generates forty pulses to move the pulley 27A to a position in which oscillation end line 88 is presumably positioned beneath sensors 90 and 92.

F. Movement of Pulley 27A from Oscillation End Line 88 to the Radial Centerline of Spoke 86

After oscillation end line 88 is positioned beneath sensors 90 and 92, control 55 orders the stepper motor to reverse direction and move pulley 27A in the direction of arrow C so that spoke 86 passes beneath sensors 90 and 92 and pulley 27A continues turning in the direction of arrow C until oscillation guideline is presumably positioned beneath sensors 90 and 92.

G. Continued Oscillation of Fan

Control 55 continues to oscillate the fan between guide lines 87 and 88 in the manner described above unless control 55 is reprogrammed to alter the location of guide lines 87 and 88, unless the fans 10 and 20 are sufficiently out-of-synch with each other to justify a recalibration, unless the number of steps required to reach spoke 86 (when approaching from guideline 87 or when approaching from guide line 88) is outside the selected range. Control 55 recalibrates the fans 10 and 20 by directing their associated stepper motors to return each fan to the designated electronic hard stop (for example, an electronic hard stop with each flange 13, 23 ten degrees from its associated fixed hard stop 14, 24). After both fans are simultaneously located at there hard stops, control 55 re-initiates synchronous oscillation of the fans. The parameter used to determine when fans 10 and 20 are sufficiently out-of-synch to justify a recalibration can vary as desired; however, one presently used parameter is preferably in the range of five to ten degrees. For example, if a fan 10 is five or more degrees (i.e., ten or more steps) ahead of or behind another fan 20, then control 55 recalibrates the fans; or, if a fan 10 is eight or more degrees (i.e., sixteen or more steps) ahead of or behind another fan 20, then control 55 recalibrates the fans.

A particular advantage of control 55 is that it can be readily programmed to rotate a plurality of fans synchronously, or in a wave motion, or independently of one another, or in differing arcs of oscillation, or in any other desired manner.

Figure 15:
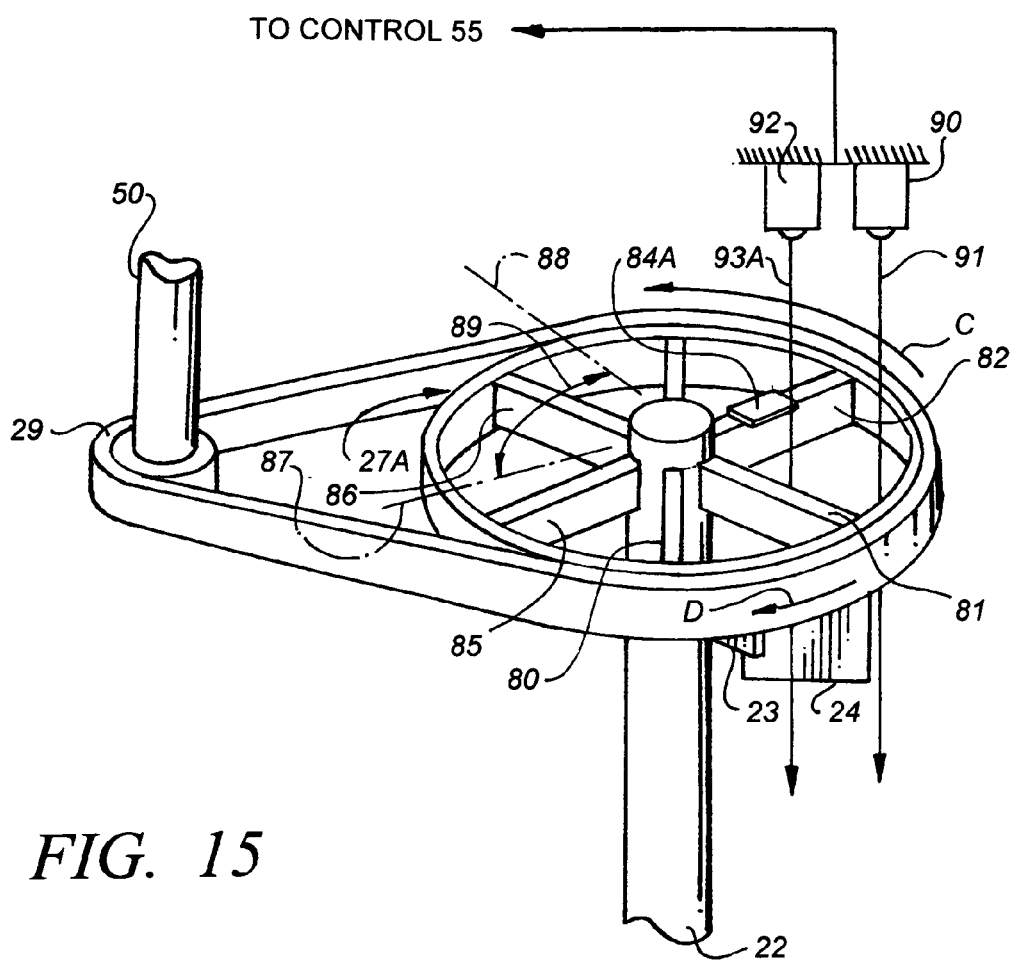

An alternate embodiment of the invention in which an electronic hard stop is utilized is illustrated in FIG. 15 and is discussed below. The structure illustrated in FIG. 15 is equivalent to that in FIG. 14 except (1) in FIG. 15, the pie-shaped piece 84 of metal that is utilized in the embodiment illustrated in FIG. 14 is removed and replaced with a small reflective member 84A fixedly attached to the top of spoke 82; (2) in FIG. 15 sensor 92 is able to sense the passage of spoke 82 because member 84A reflects sensor light 93A back to sensor 92; and, (3) in FIG. 15, sensor 92 can not, however, detect the passage of a spoke other than spoke 82. In FIG. 14, each spoke is configured such that sensor 92 can detect the spoke as it passes beneath sensor 92. In FIG. 15 this is not the case. In FIG. 15, each spoke, with the exception of spoke 82, is configured such that sensor 92 can not detect the passage of the spoke beneath sensor 92. In FIG. 15, sensor 90 can, as is the case in FIG. 14, detect the passage of each spoke 80, 81, 82, 85, 86 directly beneath sensor 90. In addition, in the embodiment of the invention in FIG. 15, controller 55 operates in a fashion that is substantially equivalent to the embodiment of the invention in FIG. 14. In FIG. 15 however, as will be seen, the only signal received by controller 55 from sensor 92 is generated when spoke 82 passes beneath sensor 92.

Optical sensors 90 and 92 continuously emit laser or other light rays 91 and 93A, respectively. Each sensor 90, 92 is mounted in a fixed position above pulley 27A. When a spoke 80-82, 85, 86 is directly beneath sensor 90, light emitted by sensor 90 is reflected upwardly back to the sensor 90. As noted, lighted emitted by sensor 92 is reflected back to sensor 92 only when spoke 82 passes beneath sensor 92. When a sensor 90, 92 receives reflected light from a spoke, the sensor generates a signal to control 55. These signals, along with knowledge by control 55 of the number of steps required by the stepper motor turning shaft 50 to rotate pulley 27A through a sixty degree arc, enables control 55 to determine the location of pulley 27A, and therefore of the fan 20 that is being rotated back-and-forth along with pulley 27A and with shaft 22 fixedly attached to pulley 27A. In particular, when pulley 27A is moving in the direction of arrow C and control 55 receives signals from sensors 90 and 92, control 55 knows that spoke 82 is directly beneath sensors 90 and 92 and that flange 23 is sixty degrees from fixed stop 24. If fans 10 and 20 are being recalibrated and if control 55 is programmed such that an electronic hard stop is defined as the position of pulley 27A when flange 23 is ten degrees of arc from hard stop 24, then once control 55 receives signals from both sensors 90 and 92, control 55 directs the stepper motor associated with shaft 50 to turn pulley 27A through an arc of fifty degrees to a position at which flange 23 is ten degrees of arc from stop 24. If fan 20 arrives at the hard stop before fan arrives at its equivalent hard stop, control 55 directs the stepper motor associated with shaft 50 to stop turning shaft 50 so that fan 10 is stationary with flange 23 ten degrees from stop 24. After fan 10 reaches its equivalent hard stop ten degrees from stop 14, control 55 simultaneously activates both fans in the direction of arrow D to resume synchronous oscillation. If when fan arrives at the electronic hard stop, fan 10 is already at its equivalent hard stop, then control 55 simultaneously activates both fans 10 and 20 in the direction of arrow D to resume synchronous oscillation.

As soon as a spoke 80-82, 85, 86 moves from beneath sensors 90 and 92, light emitted by a sensor 90, 92 does not strike a spoke, but instead passes through an open space in pulley 27A in the manner illustrated for light rays 91 and 93A in FIG. 15. When light is not being reflected back to a sensors 90 or 92, the sensors no longer generate signals back to control 55 and control 55 "knows" that a spoke is no longer positioned beneath a sensor 90, 92. When control 55 receives signals from both sensors, control 55 knows that spoke 82 is located directly beneath the sensors in the same vertical plane that passes through stop 24 and sensors 90 and 92. When control 55 receives signals from only sensor 90, control 55 knows that some spoke other than spoke 82 is positioned directly beneath sensors 90 and 92. Control 55 is programmed with an electronic hard stop that halts the stepper motor turning shaft 50—and therefore halts movement of shaft 22 and fan 20 on shaft 22—before flange 23 contacts 24. For example, the electronic hard stop may comprise halting the stepper motor and the rotation of pulley 27A and flange 23 when flange 23 is at a point which is about ten degrees of rotation from stop 24, and from being positioned beneath sensors 90 and 92. If fan 20 is being synchronized and recalibrated with fan 10 (FIG. 1) and if fan reaches the desired electronic hard stop prior to fan 10, then control 55 orders the stepper motor turning shaft 50 to stop and allows the stepper motor turning shaft 40 (and therefore shaft 12 and fan 10) to continue turning shaft 40 until flange 13 also arrives at a point (i.e., the electronic hard stop) which is about ten degrees of rotation from stop 14.

Once each shaft 12 and 22, fan 10 and 20, and its associated pulley 27A reaches the desired electronic hard stop, control 55 reactivates simultaneously the stepper motors associated with shaft 40 and 50 so that fans 10 and 20 simultaneously and synchronously are moved in the direction indicated by arrow D in FIG. 15 (which direction is opposite that of the direction indicated by arrow C) and such that flanges 13 and 23 move away from stops 14 and 24. The stepper motors continue to turn shafts 40 and 50 in the direction of arrow D until a first oscillation end line, indicated in FIG. 15 by dashed line 87, is reached, and said end line is positioned directly beneath sensors 90 and 92. After the first oscillation end line indicated by line 87 is reached, control 55 reverses the direction of rotation of the stepper motors, and accordingly fans 10 and 20, until pulley 27A rotates a distance sufficient for a second oscillation end line, indicated in FIG. 14 by dashed line 88, to be positioned directly beneath sensors 90 and 92. Lines 87 and 88 represent the farthest points of travel of an oscillating fan, and are not positioned on a spoke 80-82, 85, 86. As a result, light from sensors 90 and 92 is not reflected by such lines. If one or more of the lines 87, 88 were coincident with a spoke 80-82, 85, 86, then light from sensor 90 would be reflected back to the sensors when the spoke was positioned directly beneath the sensor 90.

When, in the embodiment of the invention in FIG. 15, the second oscillation end line 88 is reached, control 55 again reverses the direction of rotation of the stepper motors to move pulleys 27A and fans 10 and 20 to again position the first oscillation end line 87 under both sensors, and so on. Oscillation of shafts 12 and 22 and fans 10 and 20 between said first and second oscillation end lines continues until the oscillation end lines are replaced with one or more new oscillation end lines, until the fans must be recalibrated because the required number of steps to reach a spoke is outside of a selected range, or, until control 55 determines that fan 10 is out-of-synch with fan 20. If control 55 determines that fan 10 is out-of-synch with fan 20, control 55 generates signals to the stepper motors that are operatively associated with fans 10 and 20 to move each fan 10, 20 back to an equivalent electronic hard stop in the manner discussed above. After each fan 10, 20 reaches and is in its equivalent electronic hard stop at the same time as the other fan, each fan is pointing in the same direction. Control 55 then activates simultaneously the stepper motors to move the fans 10 and 20 synchronously to position the first selected oscillation end line under sensors 90 and 92, then to position the second selected oscillation end line under sensors 90 and 92, then to position the first selected oscillation end line under sensors 90 and 92, and so on. In these examples, the electronic hard stop of each fan occurs when its associated flange 13, 23 is ten degrees of arc from its associated stop 14, 24.

As would be appreciated by those of skill in the art, in the embodiment of the invention in FIG. 15 control 55 can be programmed to set the first and second oscillation end lines at any desired position as long as oscillation of a fan 10, 20 between such end lines does not require a flange 13, 23 to pass through a stop 14, 24.

In FIG. 15, control 55 can determine the location of each spoke 80-82, 85, 86 and of the oscillation end lines 87, 88 because control 55 knows the number of steps that must be produced by the stepper motor to rotate pulley 27A through an arc of travel equivalent to the arc from one spoke 85 to the next 86, to move from the electronic hard stop through an arc of travel to a first selected oscillation end line 87, and to move from a spoke 86 through an arc of travel to a selected oscillation end line 87 or 88. Sensor 90 continually provides control 55 with an indication of when spokes 80-82, 84, 85 (or some other selected reference point(s)) pass beneath sensors 90. Sensor 92 (along with sensor 90) provides control 55 with an indication of when spoke 82 passes beneath sensor 92. In order to determine the location of a pulley 20 and its associated fan, control 55 correlates signals from sensors 90 and 92 with data indicating the number of steps produced by a stepper motor in rotating pulley 27A to move one spoke 80-82, 85, 86 out from beneath sensors 90 and 92 and to move another sequential spoke to a position beneath sensors 90 and 92. The following example is presented by way of illustration, and not limitation, of the invention.

EXAMPLE II

Embodiment of the Invention in FIG. 15

A stepper motor 51 must turn, or produce, one-hundred and twenty steps to rotate a pulley 27A (and its associated fan 20) through an arc of sixty degrees. Rotating pulley 27A through an arc of sixty degrees is sufficient to move a first spoke 86 out from beneath sensors 90 and 92 and to replace the first spoke with a second sequential spoke 85 when pulley 27A is turned in the direction of arrow D in FIG. 15. Accordingly, each two steps produced by motor 51 rotate pulley 27A through a one degree arc.

A. Distance in Degrees of Electronic Hard Stop from Spokes and Oscillation End Lines If the electronic hard stop that is selected stops and places flange 23 at a position that is ten degrees of arc away from stop 24, if the second oscillation end line 88 is twenty degrees of arc away from spoke 86 (i.e., away from the radial longitudinal centerline of spoke 86), and if the first oscillation end line 87 is five degrees of arc away from spoke 87 (i.e., away from the radial longitudinal centerline of spoke 85), then 450 steps must be produced by stepper motor 51 to rotate pulley 27A in the direction of arrow D from the selected electronic hard stop (at which flange 23 is ten degrees of arc away from stop 24) to a position at which the first oscillation end line 87 is positioned directly beneath sensors 90 and 92. When flange 23 and shaft 22 are stationary in the hard stop position with flange 23 ten degrees of arc from fixed hard stop 24, sensors 90 and 92 are in a position that is fifty degrees of arc away from the radial centerline of spoke 82, 150 degrees of arc away from end line 88, 170 degrees of arc away from the radial centerline of spoke 86, and 225 degrees of arc away from the end line 87.

B. Movement of Pulley 27A from Hard Stop to Radial Centerline of Spoke 86.

In order to move pulley 27A in the direction of arrow D from the hard stop to the radial centerline of spoke 86, control 55 commands stepper motor 51 to move shaft 50 three hundred and forty steps to rotate pulley 27A in the direction of arrow D to place the radial centerline of spoke 86 directly beneath sensors 90 and 92.

C. Movement of Pulley 27A from the Radial Centerline of Spoke 86 to Oscillation End Line 87

The microprocessor and computer program utilized by the microprocessor in control 55 knows that the distance from the centerline of spoke 86 to end line 87 consists of a fifty-five degree arc and that it should required one hundred and ten steps to turn pulley 27A through the fifty-five degree arc. After the stepper motor generates one hundred and ten steps and moves pulley 27A through a distance generally equivalent to a fifty-five degree arc (so that end line 87 is presumably positioned directly beneath—but not detected by—sensors 90 and 92), control 55 assumes that end line 87 is positioned directly beneath sensors 90 and 92.

The Reset Function

In order to move pulley 27A in the direction of arrow C from the first oscillation end line 87 to the second oscillation end line 88, one hundred and fifty steps must be produced by stepper motor 51 to rotate pulley 27A a sufficient distance in the direction of arrow C. Further, the microprocessor and computer program utilized by the microprocessor in control 55 know that the distance from oscillation end line 87 to the center line of spoke 86 should comprise one hundred and ten steps. When pulley 27A is being turned in the direction of arrow C to move pulley 27A from a position with oscillation end line 87 under sensor 90 to a position with the center line of spoke 86 directly under sensor 90, control 55 resets the counter to zero when the center line of spoke 86 is reached. If the number of steps required to move pulley 27A from a position with end line 87 directly under sensor 90 to a position with the center line of spoke 86 directly under sensor 90 is less than or more than one hundred and ten steps, control 55 still resets the counter to zero unless the number of steps is greater than or less than one hundred and ten steps within a selected range. If, for example, the range is plus or minus four steps, then control 55 resets the counter to zero if the number of steps required to move from end line 87 to the centerline of spoke 86 is in the range of one hundred and six to one hundred and fourteen steps. If the number of steps required is outside this range (for example one hundred and two steps), then control 55 initiates recalibration by moving each fan to the electronic stop in the manner noted above in order to recalibrate synchronously the fans. If the number of steps require to move pulley 27A from a position with end line 87 directly under sensor 90 to a position with the center line of spoke 86 directly under sensor 90 is within the selected range and control 55 resets the counter, then control 55 permits the stepper motor to continue to move pulley 27A in the direction of arrow C until end line 87 is positioned beneath sensor 90.

D. Movement of Pulley 27A from Oscillation End Line 87 Back to the Radial Centerline of Spoke 86

After end line 87 is presumably positioned beneath sensors 90 and 92, control 55 reverses the stepper motor such that stepper motor again generates one hundred and ten steps and moves pulley 27A in the direction of arrow D through a distance generally equivalent to a fifty-five degree arc and such that the centerline of spoke 86 should once again be positioned under sensor 90.

If the number of steps required to move pulley 27A from a position with end line 87 positioned under sensor 90 to a position with the centerline of spoke 86 positioned under sensor 90 is one hundred and ten steps, or, is greater than or less than one hundred and ten steps within the selected range of one hundred and six steps to one hundred and fourteen steps), control 55 resets the counter to zero, and permits the stepper motor to continue moving pulley 27A in the direction of arrow D. If, on the other hand, the number of steps required to move pulley 27A from a position with end line 87 positioned under sensor 90 to a position with the centerline of spoke 86 positioned under sensor 90 is outside the selected range, control 55 initiates the recalibration procedure and directs each fan 10, 20 to its electronic hard stop. After fans 10 and 20 are simultaneously at the electronic hard stop, control 55 directs the stepper motors in control of fans 10 to 20 to resume simultaneously synchronous oscillation.

E. Movement of Pulley 27A from Spoke 86 to Oscillation End Line 88

After the radial centerline of spoke 86 is aligned directly beneath sensor 90 and control permits continued movement of pulley 27A in the direction of arrow D, the stepper motor generates forty pulses to move the pulley 27A to a position in which oscillation end line 88 is presumably positioned beneath sensor 90.

F. Movement of Pulley 27A from Oscillation. End Line 88 Back to the Radial Centerline of Spoke 86

After oscillation end line 88 is positioned beneath sensors 90 and 92, control 55 orders the stepper motor to reverse direction and move pulley 27A in the direction of arrow C so that spoke 86 passes beneath sensor 90 and pulley 27A continues turning in the direction of arrow C until oscillation guideline is presumably positioned beneath sensor 90.

Continued Oscillation of Fan

Control 55 continues to oscillate the fan between guide lines 87 and 88 in the manner described above unless control 55 is reprogrammed to alter the location of guide lines 87 and 88, unless the fans 10 and 20 are sufficiently out-of-synch with each other to justify a recalibration, or unless the number of steps required to reach spoke 86 (when approaching from guideline 87 or when approaching from guide line 88) is outside the selected range. Control 55 recalibrates the fans 10 and 20 by directing their associated stepper motors to return each fan to the designated electronic hard stop (for example, an electronic hard stop with each flange 13, 23 ten degrees from its associated fixed hard stop 14, 24). After both fans are simultaneously located at their hard stops, control 55 re-initiates synchronous oscillation of the fans. The parameter used to determine when fans 10 and 20 are sufficiently out-of-synch to justify a recalibration can vary as desired; however, one presently used parameter is preferably in the range of five to ten degrees. For example, if a fan 10 is five or more degrees (i.e., ten or more steps) ahead of or behind another fan 20, then control 55 recalibrates the fans; or, if a fan 10 is eight or more degrees (i.e., sixteen or more steps) ahead of or behind another fan 20, then control 55 recalibrates the fans.

In the electronic hard stop embodiments of the invention, the reset function is important. The reset function tracks the number of steps required to move pulley 27A from one spoke to another and to move pulley 27A from an oscillation end line to an adjacent spoke. If the number of steps is, as discussed above, outside of a selected range, then control 55 recalibrates fans 10 and 20 by returning each fan to its electronic hard stop—the hard stop position of each fan being identical to that of the other fan(s)—and, after both fans simultaneously are located at their respective hard stop, by re-initiating simultaneously the synchronous oscillation of the fans. The reset function compensates for the tendency of the fans gradually to fall out of synchronous oscillation. During synchronous oscillation, at any given time each fan is pointed in the same direction and each flange 13, 23 is an equivalent distance from its associated stop 14, 24.

One key to the invention is that the system can "slip" without breaking. In the mechanical belt embodiment described above, the belt can slip of the fan hits a hard object—like livestock—and can not move. In the stepper motor embodiment, if a fan hits a hard object and can not move, the a magnetic slippage occurs in the stepper motor. In either case, the system ordinarily will not break and synchronous operation of fans can be corrected in the manner described.

The voltage to the coils of the stepper motor can be varied to increase or decrease the torque and to adjust the point at which the stepper motor will slip. A DC gear motor could, in the practice of the invention, be used in conjunction with a clutch mechanism that would allow slippage, but the stepper motor is presently preferred. And, a DC motor with a belt drive that slips in the manner described earlier herein is preferred over a DC motor with a clutch.

One advantage of the synchronous fan system of the invention is that, since the fans are not each mechanically connected to each other, the arc of rotation of the fans can be adjusted individually so that, if desired, each fan could be programmed to rotate through an arc different from others of the fans.

There existed at the time of the invention described herein a dominant, long felt trend to use one of three basic fan systems to cool livestock shelters:
  a. An oscillating fan system in which multiple fans synchronously oscillate.
  b. An oscillating fan system in which multiple fans oscillate randomly, and not synchronously, with respect to each other.
  c. A fan system utilizing multiple fans than do not oscillate.

With respect to oscillating synchronous fan systems used to cool livestock shelters, there existed at the time of the invention a dominant, long felt trend to mechanically link the fans in such systems. Many such fan systems were constructed and are in use today.

With respect to oscillating synchronous fan systems used to cool livestock shelters, there existed at the time of the invention a dominant, long felt trend to use a single motor to operate synchronously the fans in such systems. Many such fan systems were constructed and are in use today.

With respect to oscillating synchronous fan systems used to cool livestock shelters, there existed at the time of the invention a dominant, long felt trend to utilize fans which did not periodically calibrate by being moved to a hard stop.

With respect to oscillating synchronous fan systems used to cool livestock shelters, there existed at the time of the invention a dominant, long felt trend not to power synchronous fans with a belt which extended from a first pulley to a second pulley significantly larger than the first pulley.

There did not exist at the time of the invention set forth herein a recognized problem, market need, or motivation that provided significant impetus to develop the invention.

There did not exist at the time of the invention set forth herein a recognized problem to which there was a set of specific solutions, one of which was the invention.

One of ordinary skill in the art with respect to the invention set forth herein has specialized knowledge over and above the baseline knowledge of the general population, which specialized knowledge is in connection with cooling livestock, with mechanical fan systems, and with microprocessors utilized to operate such systems.

The TSM test can, per KSR, provide helpful insight into whether an invention is obvious.

There is no good reason not to utilize the TSM test to provide insight into whether the invention herein is obvious.

The broad general motivation to make a product or process better is common to every invention.

There normally are broad commonplace motivations with respect to each particular class of invention. For example, one commonplace motivation with respect to exercise equipment is to make it versatile.

The existence of a broad general motivation, without more, does not necessarily provide any significant impetus to produce an invention.

A specific problem, motivation, or market trend is more likely to produce significant impetus to produce an invention than a commonplace motivation. If, for example, a piece of exercise equipment causes a greater than normal quantity of injuries, that is more likely to produce significant impetus to produce an invention to improve the machine than is the commonplace motivation of making equipment better.

A problem may not provide significant impetus for an invention if the problem suggests solutions other than the invention.

Having described my invention in such terms as to enable those of skill in the art to make and use the invention, and having described the presently preferred embodiments thereof,

The invention claimed is:

1. A synchronous fan system comprising
   (a) a livestock shelter including a roof and floor;
   (b) live stock in said livestock shelter;
   (c) at least first and second spaced apart fans each suspended from said roof and including
      (i) a housing,
      (ii) a fan blade rotatably mounted on said housing,
      (iii) a motor mounted on said housing to rotate said fan blade, and
      (iv) a shaft including a proximate end connected to said housing and including a distal end extending upwardly from said housing,
   (d) a motor connected to said distal end of said shaft of said first fan to oscillate said shaft of said first fan;
   (e) a motor connected to said distal end of said shaft of said second fan to oscillate said shaft of said second fan;
   (f) a control unit to synchronously calibrate intermittently said first and second fans by rotating said shafts of each fan to
      (i) contact simultaneously a common hard stop position, and
      (ii) simultaneously move each fan away from said common hard stop position to oscillate generally synchronously between a selected pair of common steady state points.

* * * * *